United States Patent
Mo et al.

(10) Patent No.: US 10,432,039 B2
(45) Date of Patent: Oct. 1, 2019

(54) PARKING ASSIST SYSTEM AND PARKING ASSIST METHOD

(71) Applicant: NISSAN MOTOR CO., LTD., Yokohama-shi, Kanagawa (JP)

(72) Inventors: Shihang Mo, Kanagawa (JP); Yukinori Tsukamoto, Kanagawa (JP); Kengo Maikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/546,460

(22) PCT Filed: Jan. 29, 2015

(86) PCT No.: PCT/JP2015/052445
§ 371 (c)(1),
(2) Date: Jul. 26, 2017

(87) PCT Pub. No.: WO2016/121044
PCT Pub. Date: Aug. 4, 2016

(65) Prior Publication Data
US 2018/0026483 A1    Jan. 25, 2018

(51) Int. Cl.
*H02J 50/90* (2016.01)
*B60L 3/00* (2019.01)
(Continued)

(52) U.S. Cl.
CPC .......... *H02J 50/90* (2016.02); *B60L 3/00* (2013.01); *B60L 50/50* (2019.02); *B60L 53/12* (2019.02); *B60L 53/305* (2019.02); *B60L 53/665* (2019.02); *B60R 21/00* (2013.01); *H02J 7/025* (2013.01); *H02J 50/12* (2016.02); *B60L 53/60* (2019.02); *B60L 58/12* (2019.02); *H02J 7/027* (2013.01); *Y02T 10/7005* (2013.01); *Y02T 90/122* (2013.01)

(58) Field of Classification Search
None
See application file for complete search history.

(56) References Cited

U.S. PATENT DOCUMENTS

2010/0161217 A1    6/2010    Yamamoto
2012/0262002 A1    10/2012    Widmer et al.
(Continued)

FOREIGN PATENT DOCUMENTS

JP    2011-15549 A    1/2011
JP    2011-259585 A    12/2011
(Continued)

*Primary Examiner* — John Olszewski
*Assistant Examiner* — Gerrad A Foster
(74) *Attorney, Agent, or Firm* — Foley & Lardner LLP

(57) ABSTRACT

A parking assist system is used in a wireless power supply system which performs wireless power supply between a ground-side coil unit and a vehicle-side coil unit. The parking assist system determines a position of a vehicle relative to each of a first region in which the power supply is possible when a gap between the vehicle-side coil unit and the ground-side coil unit is maximum and a second region in which the power supply is possible when the gap is minimum. The parking assist system determines possibility of the power supply, based on a result of the determination on the vehicle position, and displays a result of the determination on the possibility of the power supply, for an occupant of the vehicle.

5 Claims, 17 Drawing Sheets

(51) Int. Cl.
  *B60R 21/00*    (2006.01)
  *H02J 50/12*    (2016.01)
  *H02J 7/02*     (2016.01)
  *B60L 50/50*    (2019.01)
  *B60L 53/12*    (2019.01)
  *B60L 53/66*    (2019.01)
  *B60L 53/30*    (2019.01)
  *B60L 53/60*    (2019.01)
  *B60L 58/12*    (2019.01)

(56) References Cited

U.S. PATENT DOCUMENTS

| | | |
|---|---|---|
| 2013/0030615 A1 | 1/2013 | Ichikawa |
| 2013/0278212 A1 | 10/2013 | Kai et al. |
| 2013/0313912 A1 | 11/2013 | Abe et al. |
| 2014/0035565 A1 | 2/2014 | Enthaler et al. |
| 2014/0111152 A1 | 4/2014 | Kai et al. |
| 2015/0224883 A1 | 8/2015 | Ichikawa et al. |
| 2017/0012469 A1 | 1/2017 | Taguchi |

FOREIGN PATENT DOCUMENTS

| | | |
|---|---|---|
| JP | 2014-57458 A | 3/2014 |
| JP | 2014-183695 A | 9/2014 |
| JP | 2014-233150 A | 12/2014 |
| WO | WO 2011/132272 A1 | 10/2011 |
| WO | WO 2012/090613 A1 | 7/2012 |
| WO | WO 2012/108432 A1 | 8/2012 |
| WO | WO 2015/122292 A1 | 8/2015 |

(a)

(b)

(a)

(b)

(c)

US 10,432,039 B2

PARKING ASSIST SYSTEM AND PARKING ASSIST METHOD

TECHNICAL FIELD

The present invention relates to a parking assist system and a parking assist method used in a wireless power supply system which performs wireless power supply between a ground-side coil unit and a vehicle-side coil unit.

BACKGROUND ART

A parking assist device for wireless power supply has been conventionally proposed (see Patent Literature 1). In Patent Literature 1, an image of a rear camera is displayed to guide the vehicle during parking in reverse. After a ground-side unit disappears from the image, a misalignment amount between the ground-side unit and a vehicle-side unit is calculated depending on a voltage value measured by the vehicle-side unit, and is displayed to guide the vehicle.

CITATION LIST

Patent Literature

Patent Literature 1: Japanese Patent Application Publication No. 2011-15549

SUMMARY OF INVENTION

There is a range (power suppliable region) of the misalignment amount allowable in performing the power supply. The power suppliable region greatly depends on a gap between the ground-side unit and the vehicle-side unit. However, the inventors of the present application have recognized a problem existing in Patent Literature 1, that since whether the power supply is possible or impossible is determined without considering this gap, a large power suppliable region cannot be set and convenience in parking is poor.

The present invention has been made to solve such conventional problems and an object thereof is to provide a parking assist system and a parking assist method by which a power suppliable range is increased and convenience in parking is improved.

The parking assist system of the present invention determines a position of a vehicle relative to at least each of a power suppliable region (first region) in the case where a gap between a ground-side coil unit and a vehicle-side coil unit is maximum and a power suppliable region (second region) in the case where the gap is minimum, determines possibility of the power supply based on a result of determination on the position, and displays a result of the determination on the possibility of the power supply for an occupant.

Figure 2:
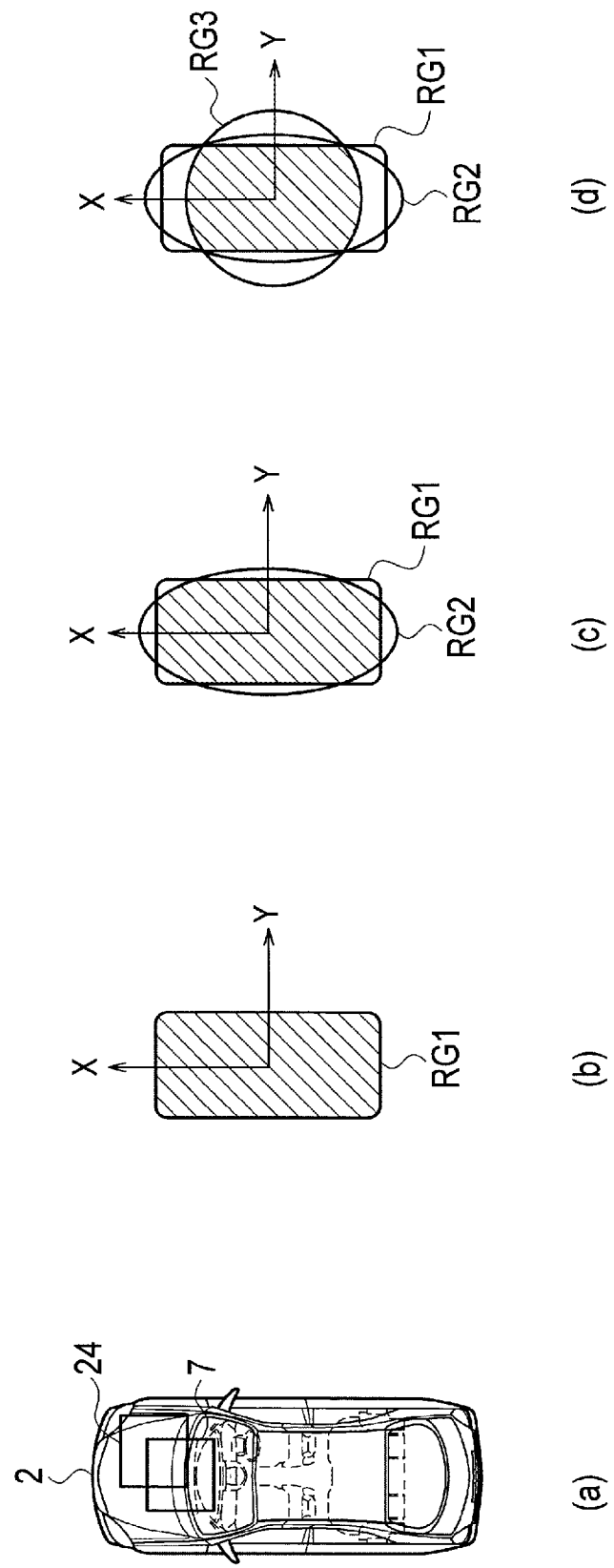

Part (a) of FIG. 2 is a top view for explaining a position of a vehicle 2 relative to a ground-side coil unit 24, and parts (b) to (d) of FIG. 2 are schematic views for explaining allowable misalignment amount ranges (RG1 to RG3).

Figure 3:
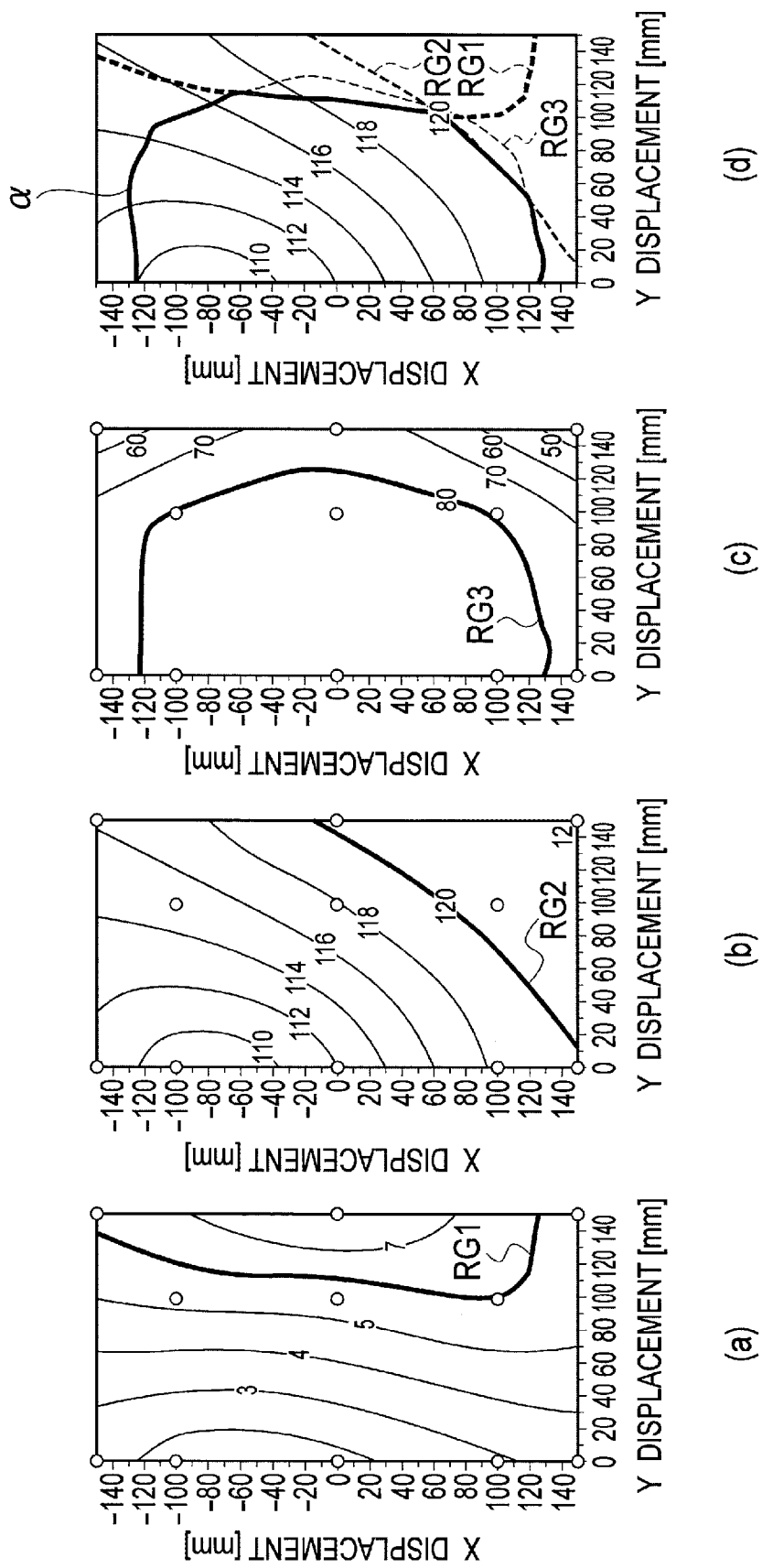

Parts (a) to (d) of FIG. 3 are respectively graphs depicting the allowable misalignment amount range (RG1) in which a leakage magnetic field meets a specified value, the allowable misalignment amount range (RG2) in which an intensity of a radio wave including a fundamental wave meets a specified value, the allowable misalignment amount range (RG3) in which power supply efficiency meets a specified value, and a power suppliable region ($\alpha$) in which all allowable misalignment amount ranges RG1 to RG3 overlap one another.

Figure 4:
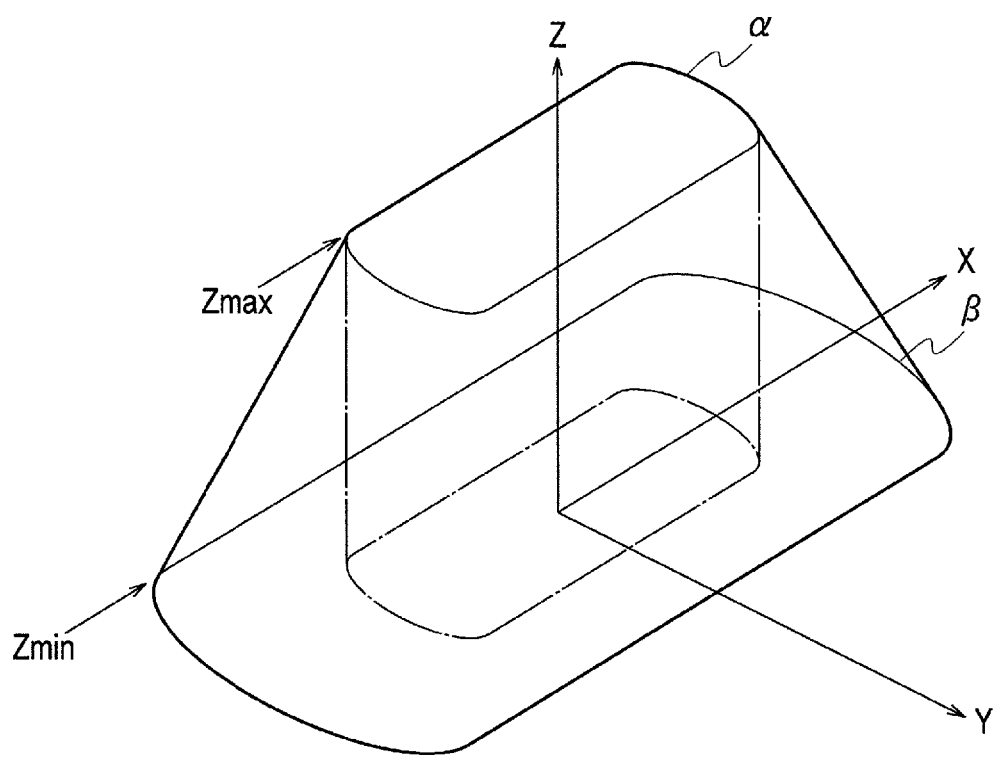

FIG. 4 is a schematic view illustrating the maximum value ($Z_{max}$) and the minimum value ($Z_{min}$) of the gap, a first region ($\alpha$), and a second region ($\alpha+\beta$).

Figure 5:
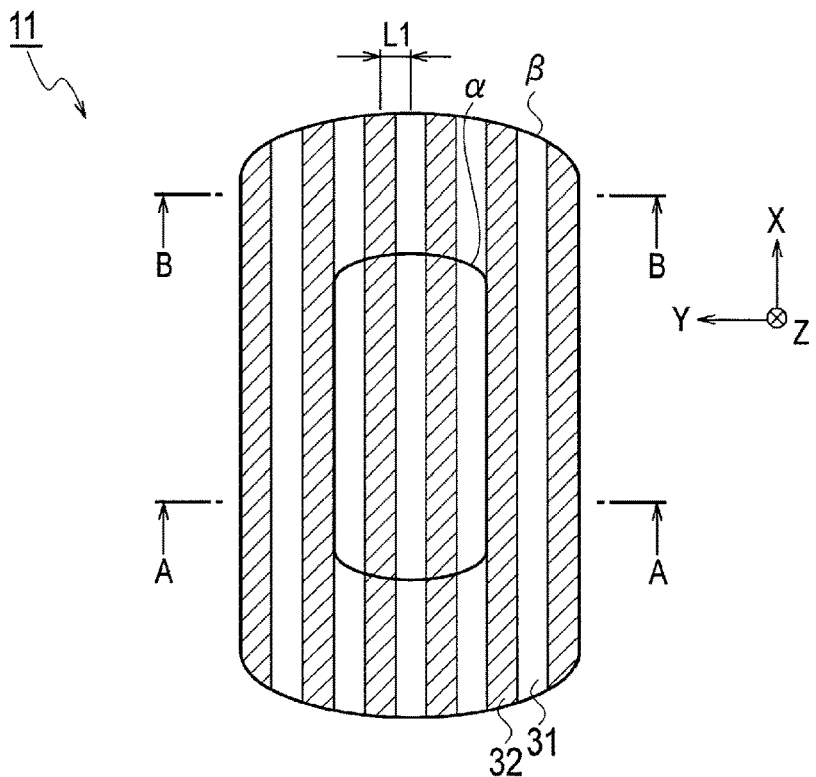
Figure 5:
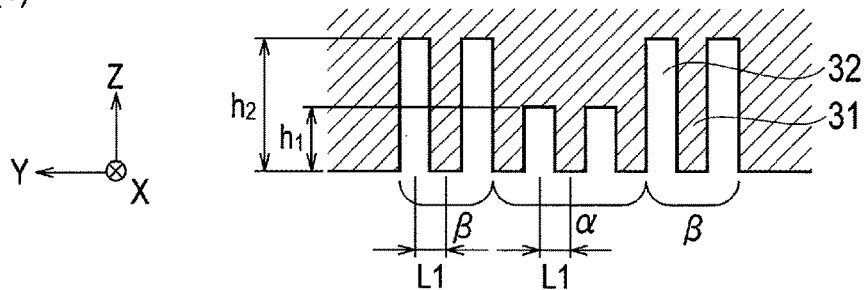
Figure 5:
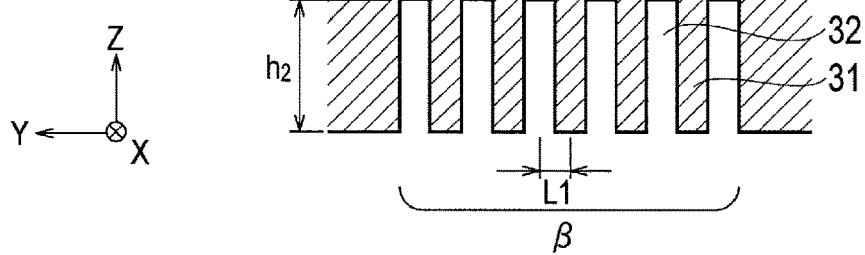

Part (a) of FIG. 5 is a plan view illustrating a first recess and protruding structure and a second recess and protruding structure formed in a region on one of the ground side and the vehicle side, part (b) of FIG. 5 is a cross-sectional view taken along a cross section A-A in part (a) of FIG. 5, and part (c) of FIG. 5 is a cross-sectional view taken along a cross section B-B in part (a) of FIG. 5.

Figure 6:
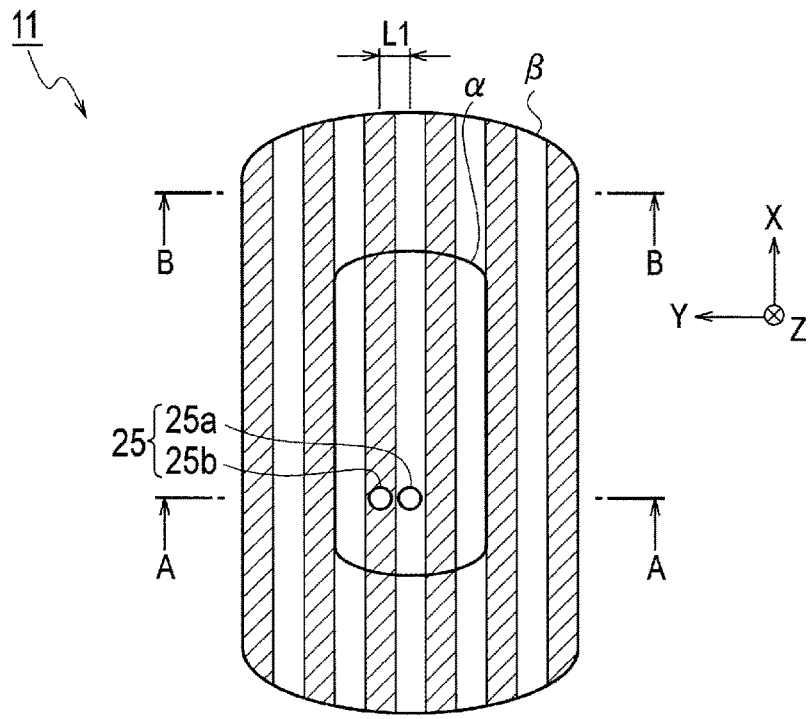
Figure 6:
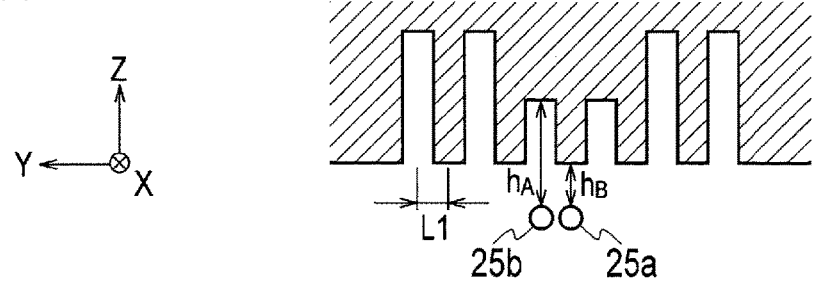
Figure 6:
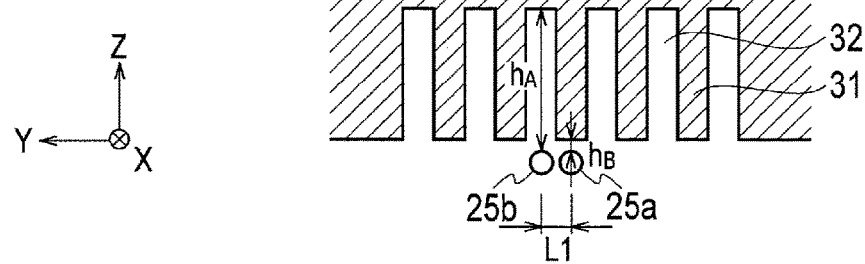

Part (a) of FIG. 6 is a plane view in which two distance measuring units (25a, 25b) are superposed on the plan view in part (a) of FIG. 5, part (b) of FIG. 6 is a cross-sectional view taken along a cross section A-A in part (a) of FIG. 6, and part (c) of FIG. 6 is a cross-sectional view taken along a cross section B-B in part (a) of FIG. 6.

Figure 7:
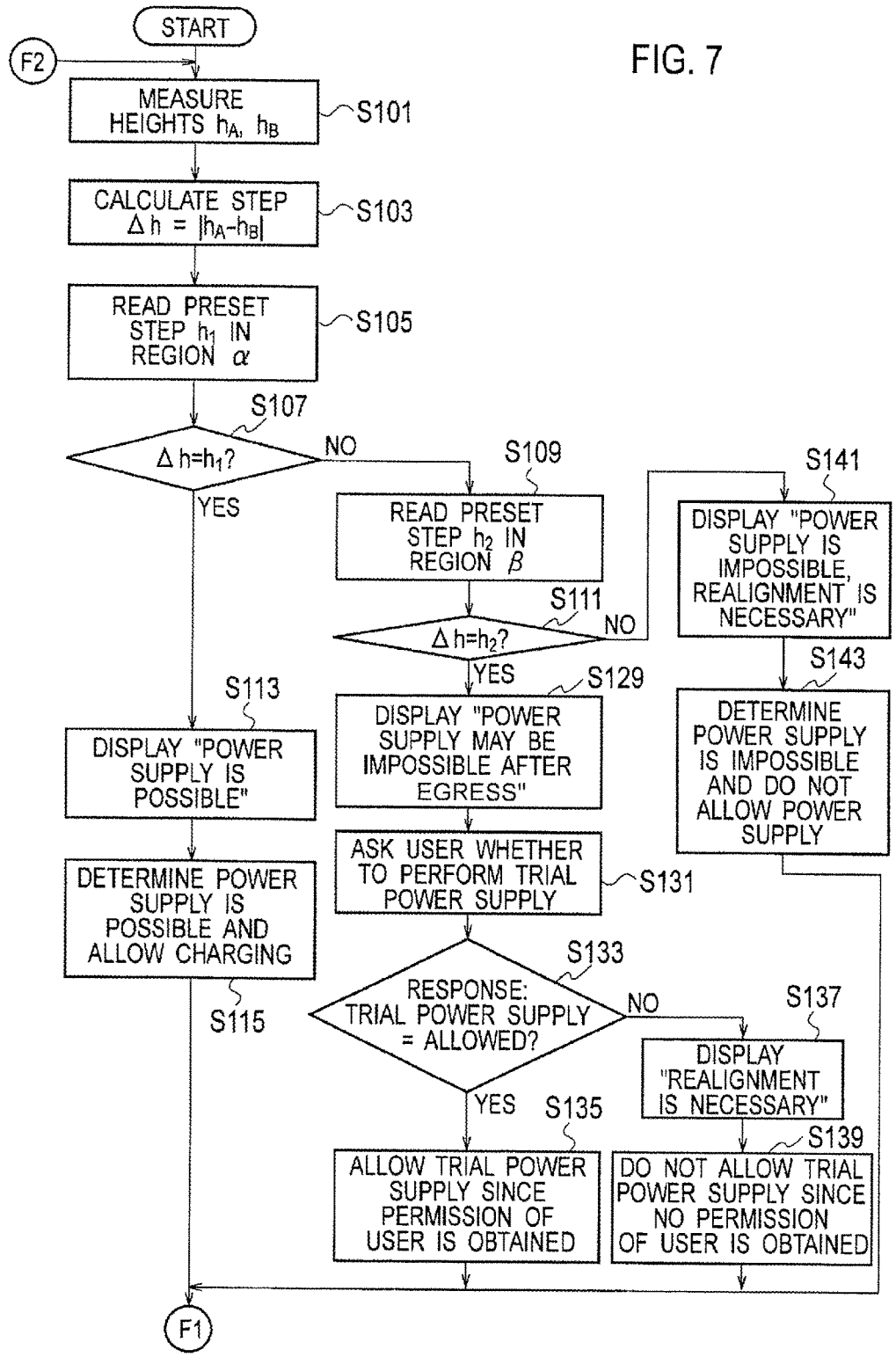

FIG. 7 is a part of a flowchart depicting a parking assist method in a first embodiment.

Figure 8:
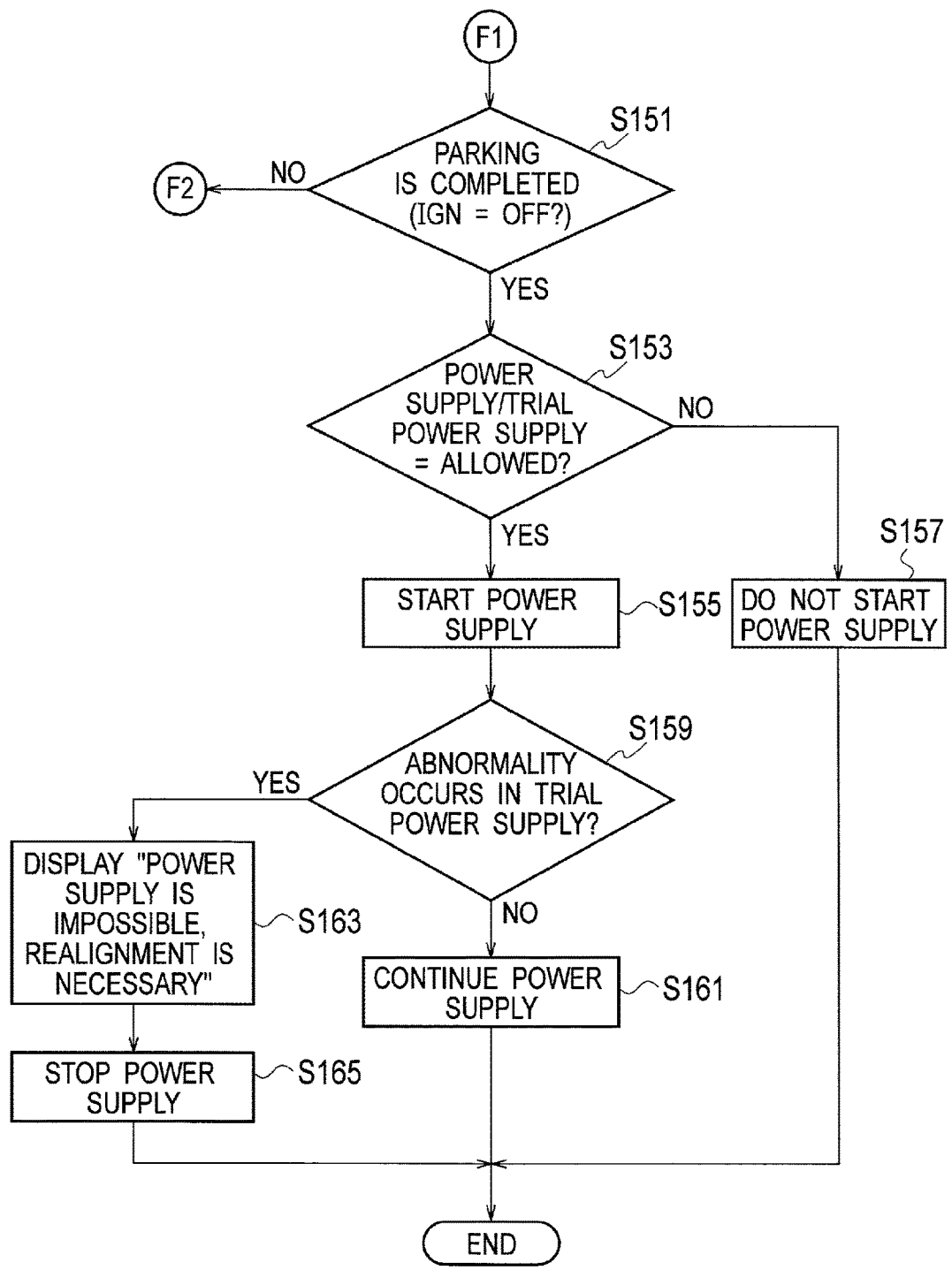

FIG. 8 is another part of the flowchart depicting the parking assist method in the first embodiment which is subsequent to FIG. 7.

Figure 9:
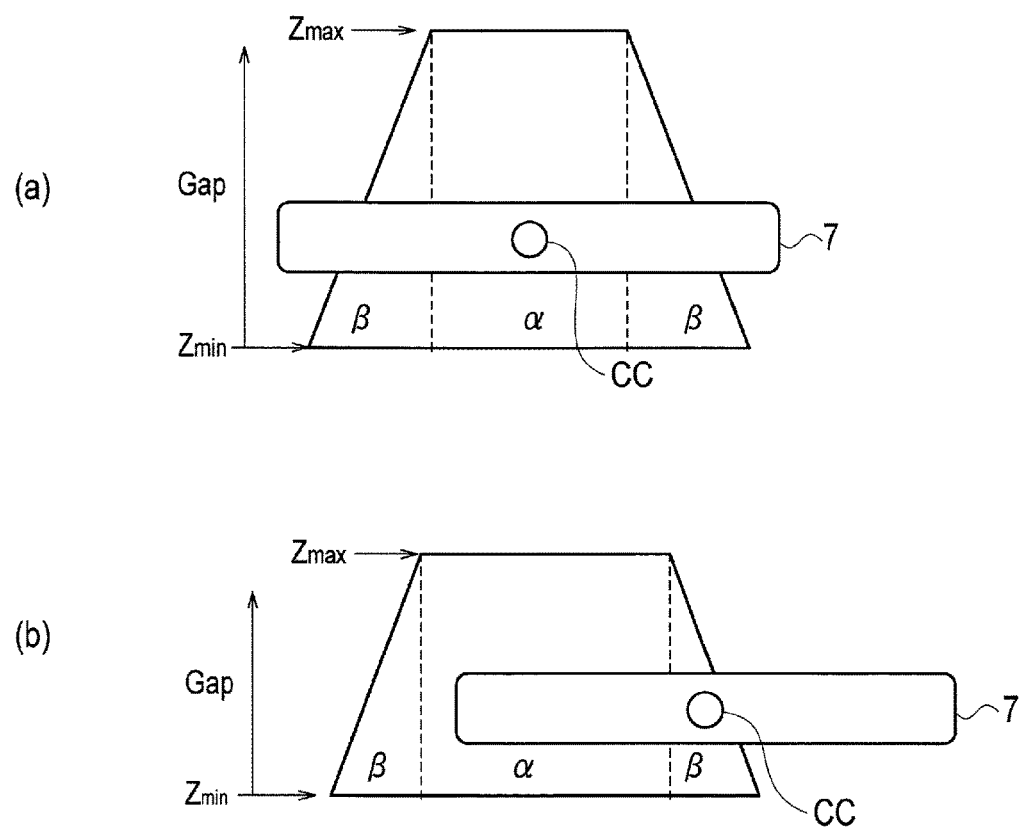

Parts (a) and (b) of FIG. 9 are each a schematic view illustrating an example of an image displayed on a display unit 5.

Figure 10:
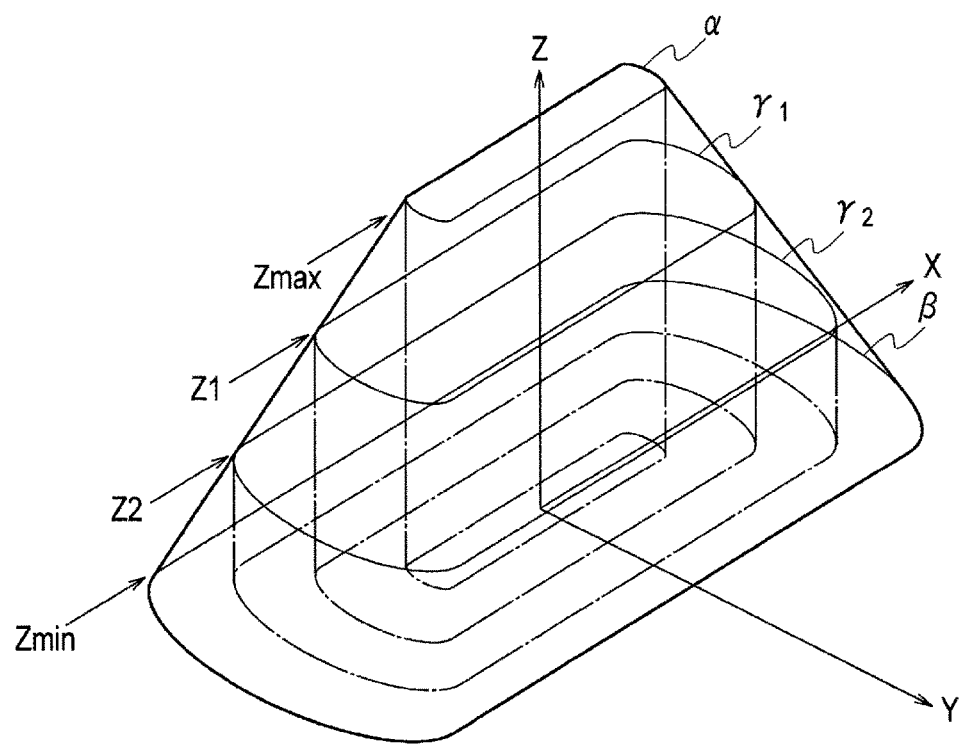

FIG. 10 is a schematic view illustrating the maximum value ($Z_{max}$), the minimum value ($Z_{min}$), Z1, and Z2 of the gap, the first region ($\alpha$), the second region ($\alpha+\beta$), a first intermediate region ($\alpha+\gamma1$), and a second intermediate region ($\alpha+\gamma1+\gamma2$).

Figure 11:
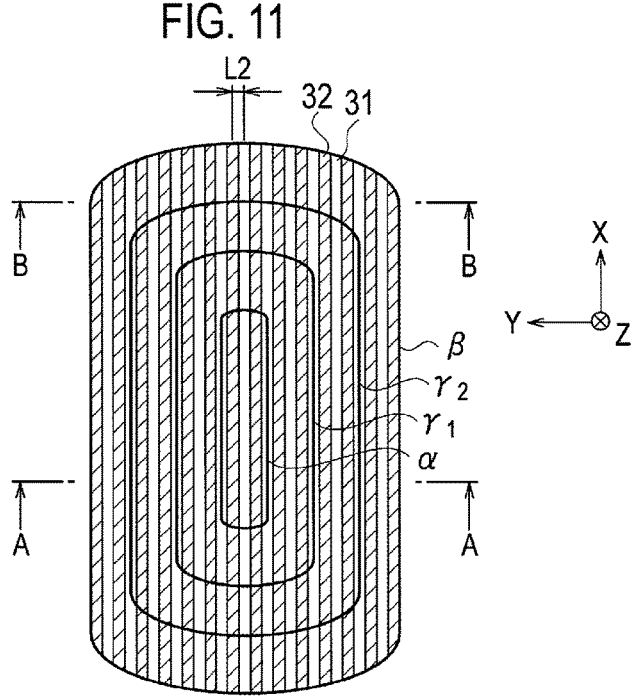
Figure 11:
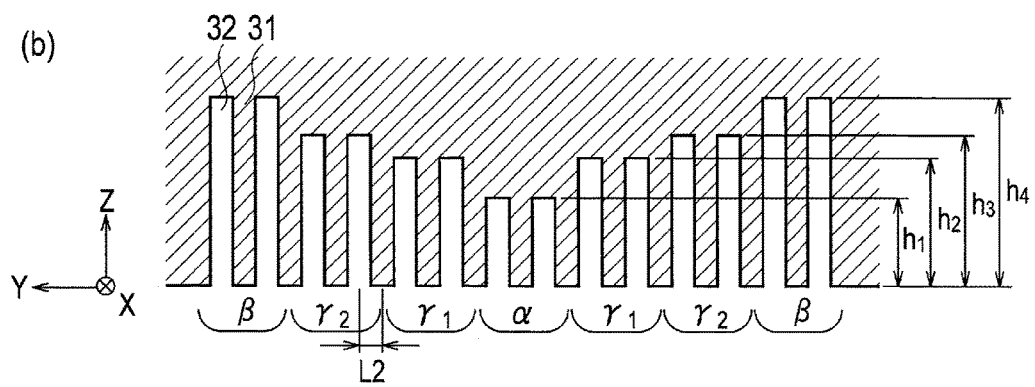
Figure 11:
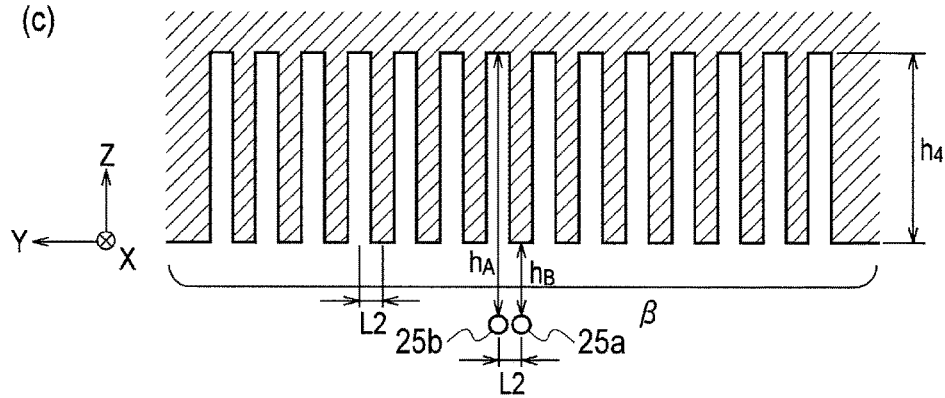

Part (a) of FIG. 11 is a plan view illustrating the first recess and protruding structure $\alpha$, the second recess and protruding structure $\beta$, a first intermediate recess and protruding structure $\gamma1$, and a second intermediate recess and protruding structure $\gamma2$ which are formed in a region on one of the ground side and the vehicle side, part (b) of FIG. 11 is a cross-sectional view taken along a cross section A-A in part (a) of FIG. 11, and part (c) of FIG. 11 is a cross-sectional view taken along a cross section B-B in part (a) of FIG. 11.

Figure 12:
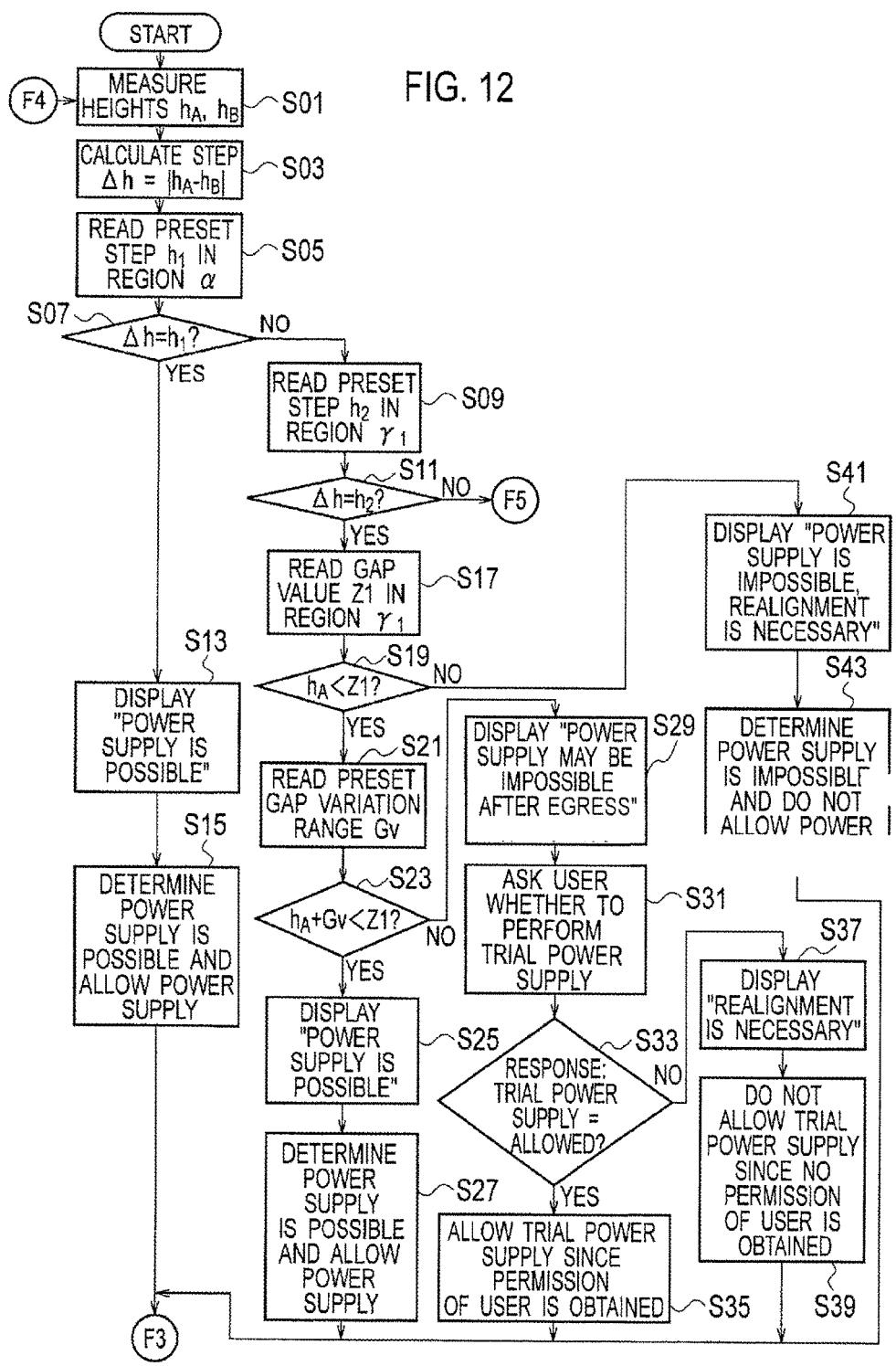

FIG. 12 is a part (1/3) of a flowchart depicting a parking assist method in a second embodiment.

Figure 13:
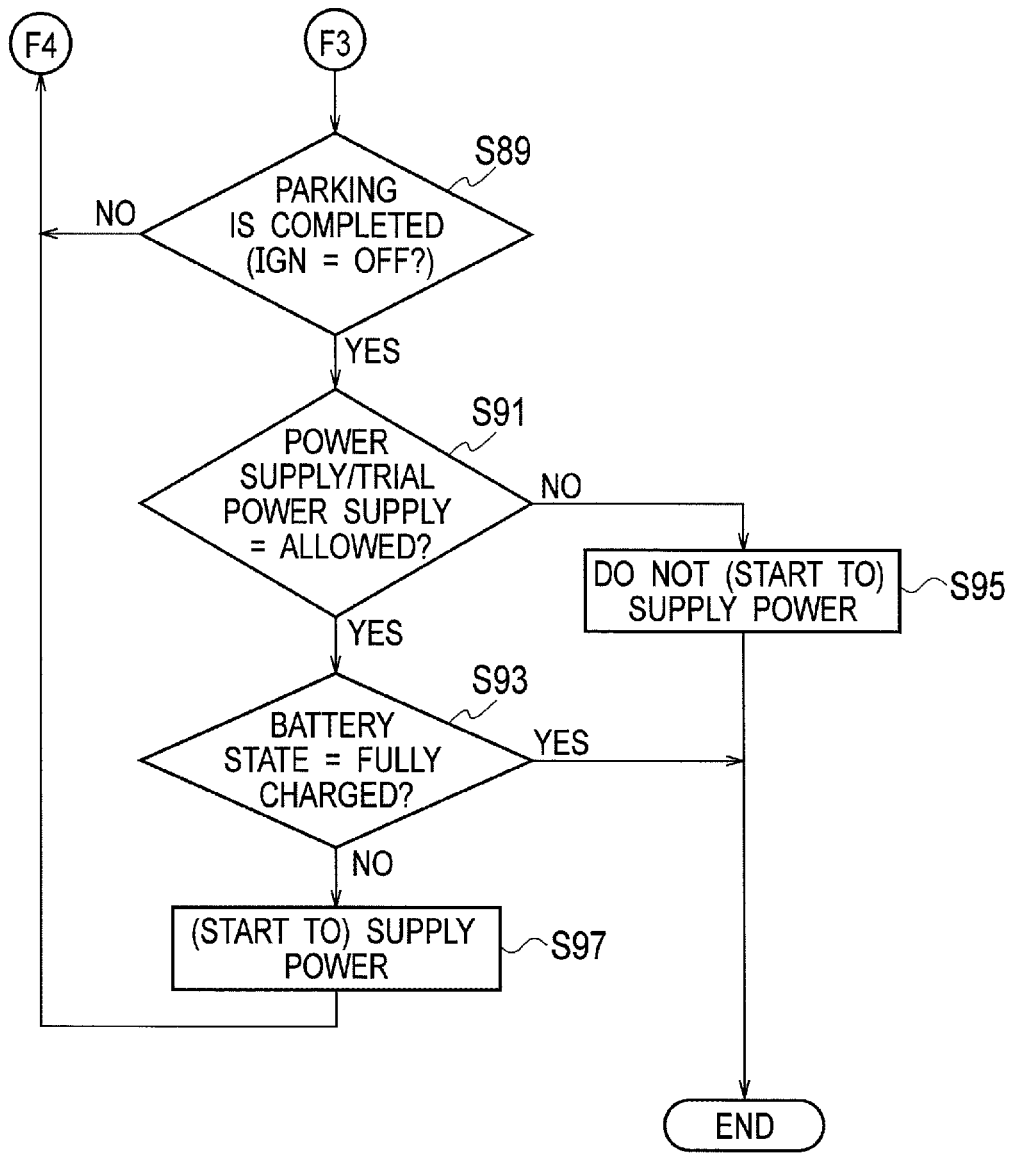

FIG. 13 is another part (2/3) of the flowchart depicting a parking assist method in the second embodiment.

Figure 14:
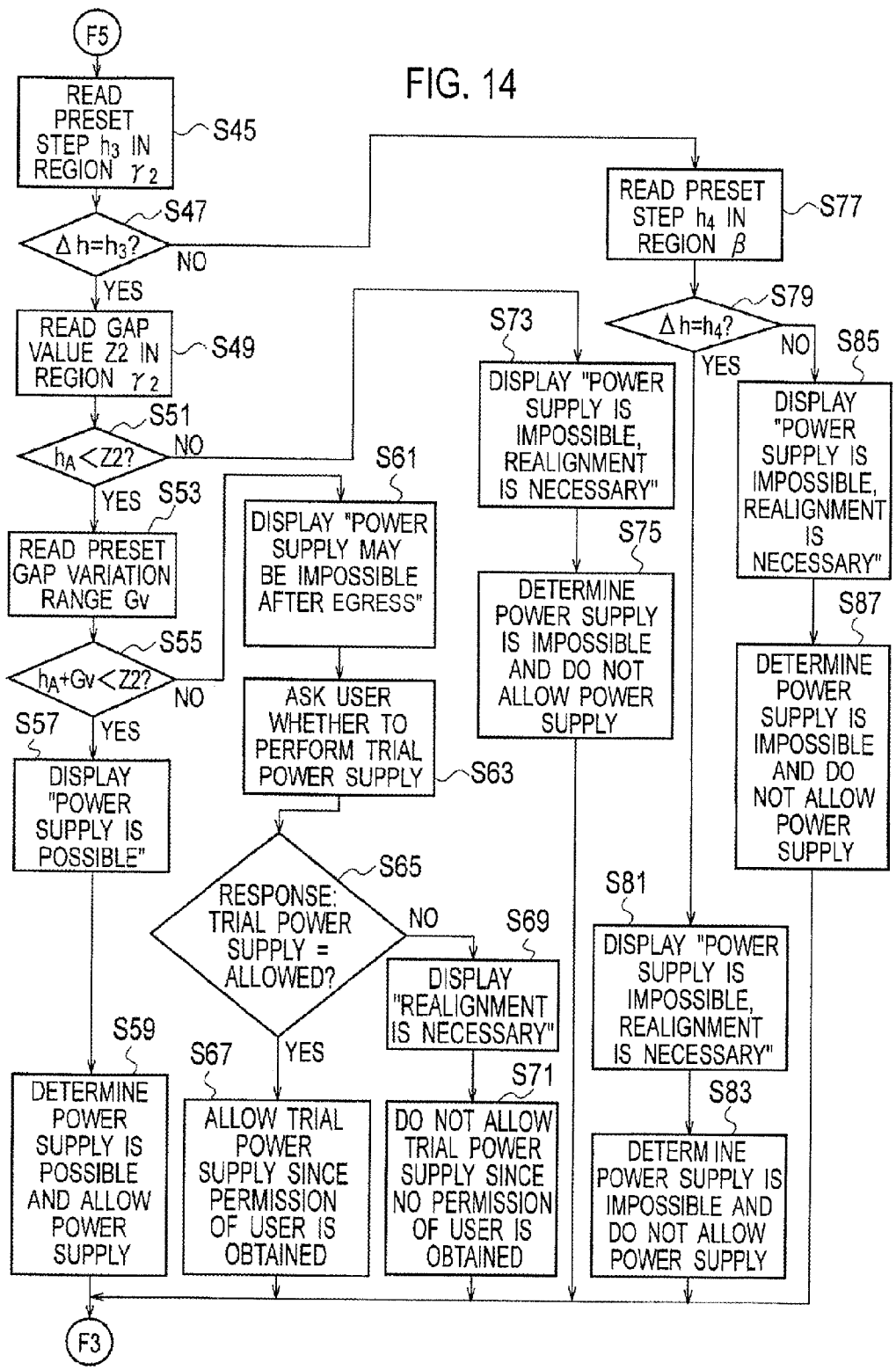

FIG. 14 is another part (3/3) of the flowchart depicting a parking assist method in the second embodiment.

Figure 15:
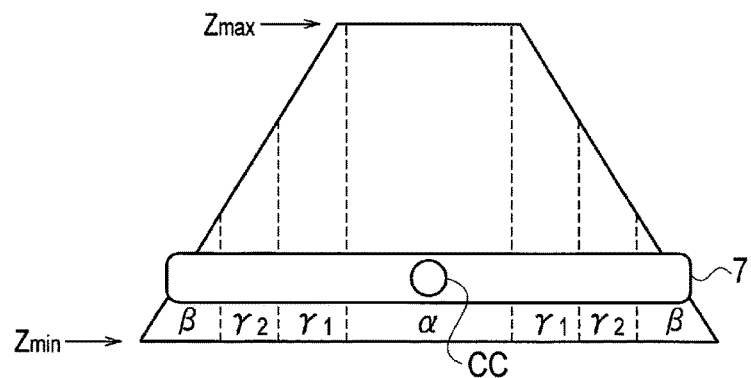
Figure 15:
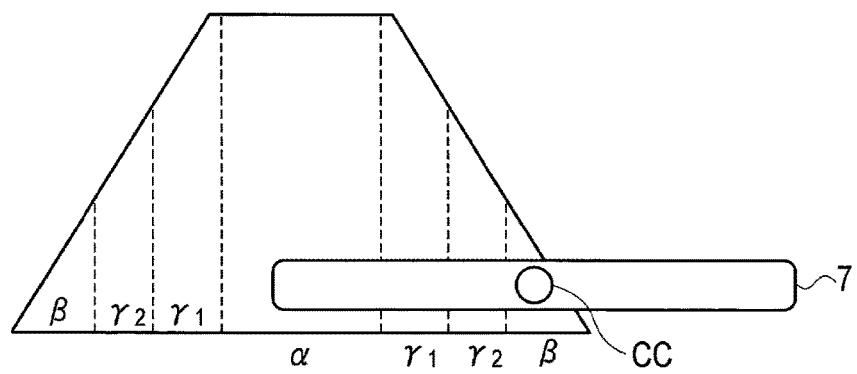

Parts (a) and (b) of FIG. 15 are each a schematic view illustrating an example of an image displayed on the display unit 5 (1/3).

Figure 16:
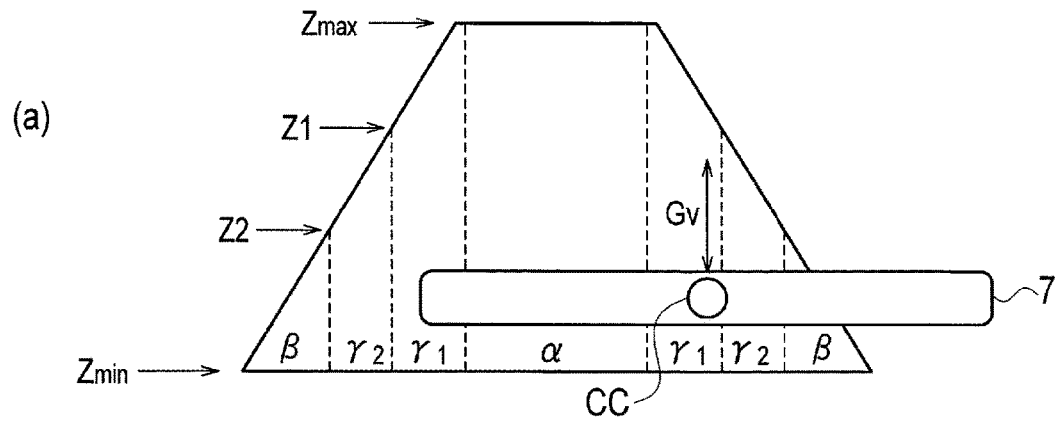
Figure 16:
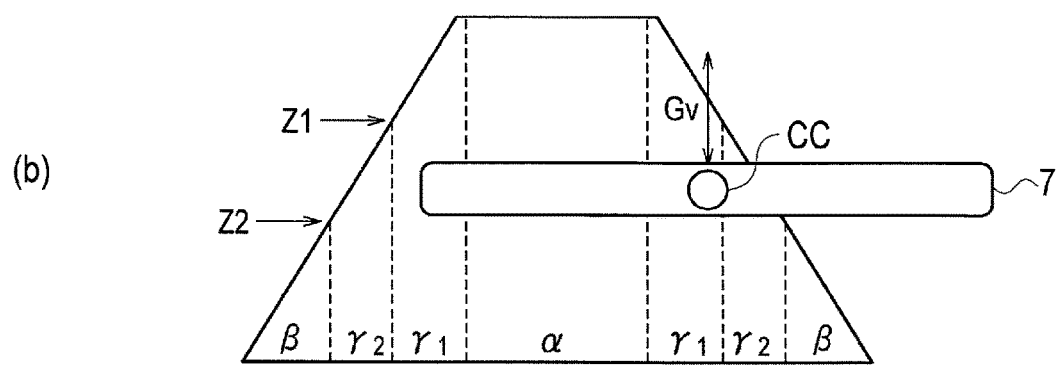
Figure 16:
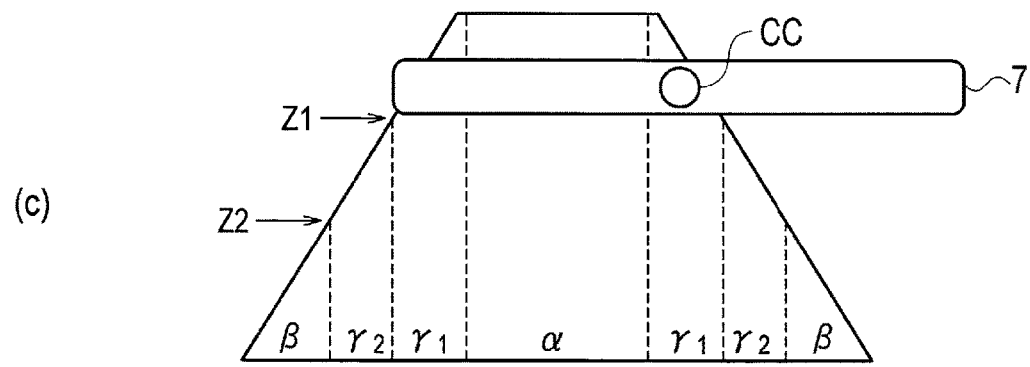

Parts (a) to (c) of FIG. 16 are each a schematic view illustrating an example of an image displayed on the display unit 5 (2/3).

Figure 17:
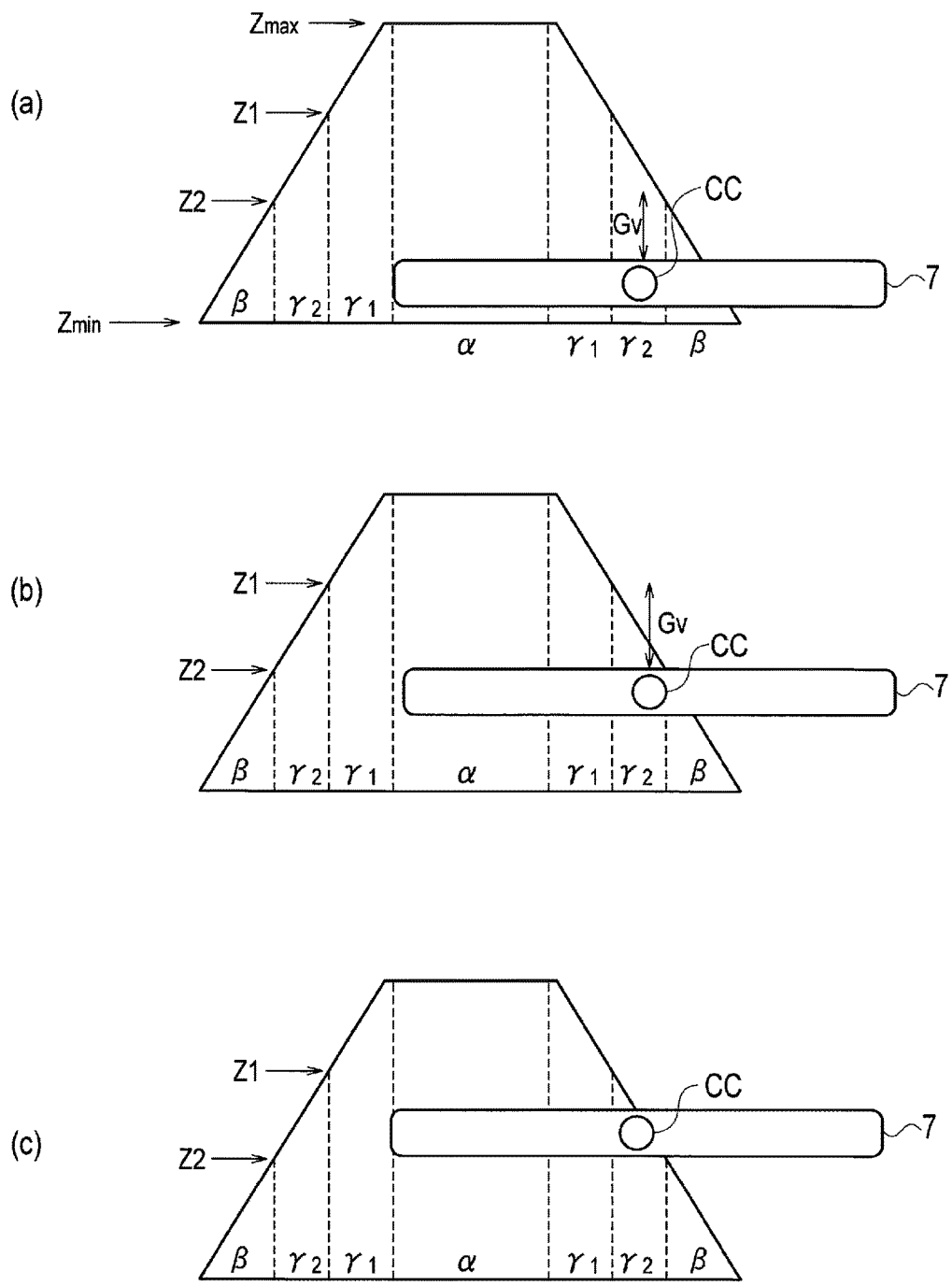

Parts (a) to (c) of FIG. 17 are each a schematic view illustrating an example of an image displayed on the display unit 5 (3/3).

DESCRIPTION OF EMBODIMENTS

Embodiments are described below with reference to multiple drawings. In the following description, a configuration of a parking assist system is schematically described. Note that, in the schematic drawings, relationships between thickness and plane dimensions, an aspect ratio in a plane, and the like are illustrated in an exaggerated manner to facilitate the understanding. The same members are denoted by the same reference numerals and overlapping description is omitted.

First Embodiment

[Wireless Power Supply System]

First, a wireless power supply system in the embodiment is described with reference to the drawings. The wireless power supply system is a system which performs wireless power supply between a ground-side coil unit 24 and a vehicle-side coil unit 7. Specifically, the wireless power supply system is a system which can wirelessly supply power from a coil buried under a road (ground-side coil unit 24) to a coil mounted near a bottom face of a vehicle 2 (vehicle-side coil unit 7) when the vehicle is stopped, by utilizing electromagnetic induction and resonance phenomenon. The supplied power is sent to a battery 10 (including a secondary battery) via a voltage sensor 8 and a relay switch 9 and the battery 10 is charged by the sent power.

As information indicating a power supplying condition, a signal indicating a charge voltage value measured by the voltage sensor 8 is sent from the voltage sensor 8 to a vehicle controller 4. A signal indicating a state of charge (SOC) or a condition of a remaining capacity of the battery 10 is sent from the battery 10 to the vehicle controller 4. The vehicle controller 4 controls connection and disconnection (on/off) of the relay switch 9, based on the sent signals described above and transmits information to a ground-side power source box 3 via a communication unit 6.

Meanwhile, the wireless power supply system includes the ground-side power source box 3 and the ground-side coil unit 24 as configurations on the ground side. The ground-side power source box 3 includes: a power unit 23 which converts AC power supplied from a grid power source to AC power with an AC voltage, an AC current, and an AC period to be used in the wireless power supply and which sends the converted AC power to the ground-side coil unit 24; a ground controller 21 which controls operations of the power unit 23; and a communication unit 22 which communicates wirelessly with the communication unit 6 mounted in the vehicle 2. The ground-side coil unit 24 wirelessly supplies the AC power sent from the power unit 23 to the vehicle-side coil unit 7 by utilizing electromagnetic induction and resonance phenomenon. The signals indicating the power supply condition and the state of charge (SOC) or the condition of the remaining capacity of the battery 10 which are transmitted from the communication unit 6 on the vehicle side are received by the communication unit 22. The received signals are sent to the ground controller 21, and the ground controller 21 controls the conversion of the AC power and the power transmission to the ground-side coil unit 24 by the power unit 23, based on these signals. The wireless power supply system can thereby perform the wireless power supply between the ground-side coil unit 24 and the vehicle-side coil unit 7 and charge the battery 10 mounted in the vehicle 2.

[Parking Assist System]

Next, a parking assist system used in the wireless power supply system is described. In order to perform the wireless power supply described above, as illustrated in part (a) of FIG. 2, the position of the vehicle 2, more specifically, the position of the vehicle-side coil unit 7 needs to be aligned with the ground-side coil unit 24 in advance. The parking assist system 1 is a system which assists an operation of aligning the vehicle, that is parking which is performed by an occupant of the vehicle 2 being the user of the parking assist system 1.

Specifically, the parking assist system 1 determines the positional relationships between the ground-side coil unit 24 and the vehicle-side coil unit 7 and presents information on the possibility of the power supply to the occupant of the vehicle 2, based on a result of this determination. A range of an allowable amount of misalignment between the coils (7, 24) in performing the power supply (power suppliable region) is set in advance based on the ground-side coil unit 24. For example, as illustrated in parts (b) to (d) of FIG. 2, a range in which an allowable misalignment amount range (RG1), an allowable misalignment amount range (RG2), and an allowable misalignment amount range (RG3) overlap one another can be set as the "power suppliable region," the allowable misalignment amount range (RG1) being a range in which a leakage magnetic field meets a specified value, the allowable misalignment amount range (RG2) being a range in which an intensity of a radio wave including a fundamental wave meets a specified value, the allowable misalignment amount range (RG3) being a range in which power supply efficiency meets a specified value. The power suppliable region may be set in consideration of also allowable misalignment amount ranges based on an output value of the power sent from the ground-side coil unit 24 and the temperature of the coils (7, 24). Parts (a) to (d) of FIG. 3 depict the allowable misalignment amount ranges (RG1 to RG3) and the power suppliable region (α, first region) in the case where the maximum value ($Z_{max}$) of a gap between the ground-side coil unit 24 and the vehicle-side coil unit 7 is set to 150 mm. The units of contour lines are [μT] in part (a), [dBμV/m] in parts (b) and (d), and [%] in part (c) of FIG. 3. Moreover, the X-axis is an axis parallel to a traveling direction of the vehicle 2, the Y-axis is an axis perpendicular to the traveling direction of the vehicle 2, and the Z axis is an axis perpendicular to the X-axis and the Y-axis. A method of setting the "power suppliable region" in each case is merely an example and the "power suppliable region" may be determined by using a different method.

The parking assist system 1 determines whether the vehicle-side coil unit 7 is in the power suppliable region from time to time during the parking, and presents the information on the possibility of the power supply to the occupant of the vehicle 2, based on a result of this determination.

The range of the allowable amount of misalignment between the coils (7, 24) in the power supply (power suppliable region) depends greatly on the distance, that is the gap between the ground-side coil unit 24 and the vehicle-side coil unit 7. When the distance (gap) between the ground-side coil unit 24 and the vehicle-side coil unit 7 becomes smaller, the power supply efficiency between the coils increases and the power suppliable region thus becomes larger. Meanwhile, when the distance (gap) between the ground-side coil unit 24 and the vehicle-side coil unit 7 becomes larger, the power supply efficiency decreases and the power suppliable region thus becomes smaller.

The gap between the ground-side coil unit 24 and the vehicle-side coil unit 7 varies among the vehicles 2, depending on manufacturing tolerances of the vehicles 2 including manufacturing tolerances and assembly tolerances of parts forming the vehicles. Furthermore, in a certain vehicle 2, since ingress and egress of occupants and loading and unloading of luggage cause the vehicle height to change, the gap changes depending on the state of the occupants and the luggage. The parking assist system 1 sets the maximum value ($Z_{max}$) and the minimum value ($Z_{min}$) of the gap in advance in consideration of the amount of variation in the gap. An example of the maximum value ($Z_{max}$) of the gap is 160 mm and an example of the minimum value ($Z_{min}$) of the gap is 100 mm.

Furthermore, the parking assist system 1 sets in advance at least the power suppliable region (α, first region) in the case where the gap between the ground-side coil unit 24 and the vehicle-side coil unit 7 is maximum and the power suppliable region (α+β, second region) in the case where the gap is minimum.

FIG. 4 illustrates a schematic view of the maximum value ($Z_{max}$) and the minimum value ($Z_{min}$) of the gap, the first region (α), and the second region (α+β) which are set in advance as described above. The gap increases in the Z-axis direction. The power suppliable region (α+β, second region) in the case where the gap takes the minimum value ($Z_{min}$) is large, while the power suppliable region (α, first region) in the case where the gap takes the maximum value ($Z_{max}$) is small. The second region (α+β) includes the entire first region (α). In FIG. 4, the minimum value ($Z_{min}$) of the gap is set to Z=0 such that the XY plane coincides with the second region (β).

Then, the parking assist system 1 determines the position of the vehicle 2 relative to each of the power suppliable region (α, first region) in the case where the gap is maximum and the power suppliable region (α+β, second region) in the case where the gap is minimum, and assists the parking based on a result of this determination. In detail, the parking assist system 1 determines the position of the vehicle-side coil unit 7 relative to each of the first region (α) and the second region (α+β). This increases a power supply allowable range and improves convenience in parking compared to those in a comparative example in which only the first region (α) is the target of the determination.

Figure 1:
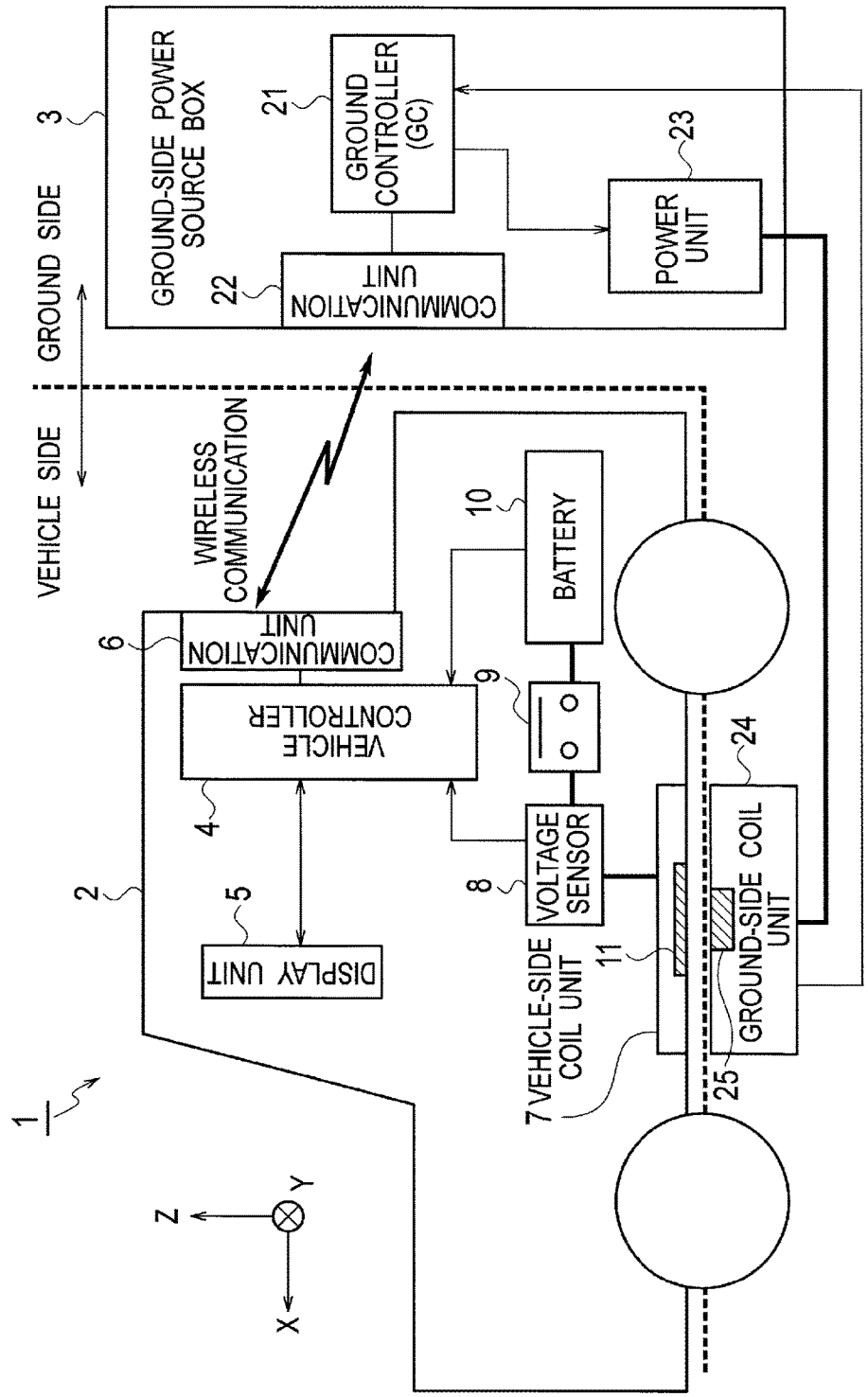
FIG. 1 is a block diagram illustrating a configuration of a wireless power supply system in embodiments.

For example, as illustrated in part (a) of FIG. 5, the parking assist system 1 includes a first recess and protruding structure α formed in a region which corresponds to the first region (α) and which is on one side out of the ground side and the vehicle side and a second recess and protruding structure β which is formed in a region which corresponds to a region within the second region (α+β) exclusive of the first region (α) and which is on the one side. When the recess and protruding structures (α, β) are formed in the regions on the vehicle side, as illustrated in FIG. 1, the first recess and protruding structure α and the second recess and protruding structure β can be formed on a lower surface of a vehicle coil cover 11 located near a bottom face of the vehicle-side coil unit 7. As another example, the first recess and protruding structure α and the second recess and protruding structure β may be formed on an upper surface of the ground-side coil unit 24.

An example of the width of the first recess and protruding structure α in a vehicle width direction (Y-axis direction) is 160 mm and an example of the width of the first recess and protruding structure α in the traveling direction (X-axis direction) is 80 mm. An example of the width of the second recess and protruding structure β in the vehicle width direction (Y-axis direction) is 300 mm and an example of the width of the second recess and protruding structure β in the traveling direction (X-axis direction) is 180 mm.

The first region (α) illustrated in part (a) of FIG. 5 corresponds to the first region (α) projected on the XY plane of FIG. 4. Each of the first recess and protruding structure α and the second recess and protruding structure β is formed by alternately and repeatedly disposing protruding portions 31 and recess portions 32 in the Y-axis direction. The protruding portions 31 and the recess portions 32 extend parallel to one another in the X-axis direction. A plane pattern of the protruding portions 31 and the recess portions 32 is thus a stripe pattern.

As illustrated in parts (b) and (c) of FIG. 5, the depth of recess portions or the height of the protruding portions ($h_1$) in the first recess and protruding structure α is different from the depth of recess portions or the height of the protruding portions ($h_2$) in the second recess and protruding structure β. Moreover, the pitch (L1) in the first recess and protruding structure α is the same as the pitch (L1) in the second recess and protruding structure β. In other words, the widths (L1) of the protruding portions 31 and the recess portions 32 in the Y-axis direction are the same in both of the first recess and protruding structure α and the second recess and protruding structure β. An example of the depth of the recess portions or the height of the protruding portions ($h_1$, $h_2$) is 1 to 3 mm, and an example of the pitch (L1) is 5 to 10 mm.

As illustrated in parts (a) to (c) of FIG. 6, the parking assist system 1 further includes at least two distance measuring units (25a, 25b) which are disposed at an interval equal to the pitch (L1) in the first recess and protruding structure and the second recess and protruding structure, on the other one of the ground side and the vehicle side. The distance measuring units (25a, 25b) are arranged in the Y-axis direction and measure the distance in the Z direction. For example, the distance measuring units (25a, 25b) are sonars or optical radars and measures the distance in the Z direction by utilizing reflection of sound or light. Accordingly, the paired distance measuring units (25a, 25b) can detect sound or light reflected by the protruding portion 31 and the recess portion 32, respectively, regardless of the position thereof relative to the recess and protruding structures (α, β). Hence, the distance measuring units (25a, 25b) can measure the distances ($h_A$, $h_B$) to the protruding portion 31 and the recess portion 32 simultaneously.

The parking assist system (vehicle position determination unit) can determine the position of the vehicle 2 relative to the ground-side coil unit 24 by comparing the difference (Δh) between the distances ($h_A$, $h_B$) measured respectively by the two distance measuring units (25a, 25b) with the depth of the recess portions or the height of the protruding portions ($h_1$, $h_2$). In other words, the parking assist system can determine the position of the vehicle relative to each of the first region (α) in which the power supply is possible when the gap is maximum and the second region (α+β) in which the power supply is possible when the gap is minimum.

When the recess and protruding structures (α, β) are formed in the regions on the vehicle side, the distance measuring units (25a, 25b) are installed on the ground side. As illustrated in FIG. 1, the distance measuring units (25a, 25b) can be installed on an upper surface of a ground coil cover 25 located near an upper face of the ground-side coil unit 24. As another example, the distance measuring units (25a, 25b) may be formed on the lower surface of the vehicle-side coil unit 7. Providing the combination of the recess and protruding structures (α, β) and the distance measuring units (25a, 25b) on the vehicle side and the ground side as described above enables determination of the vehicle position relative to the first and second regions.

The parking assist system includes, as calculators, a vehicle position determination unit configured to determine the position of the vehicle relative to each of the first region (α) in which the power supply is possible when the gap between the vehicle-side coil unit and the ground-side coil unit is maximum and the second region (α+β) in which the power supply is possible when the gap is minimum, and a supply possibility determination unit configured to determine the possibility of the power supply based on a result of the determination by the vehicle position determination unit.

For example, the vehicle position determination unit determines under which one of the following three conditions the position of the vehicle falls.

(1) Inside the first region (α)
(2) Outside the first region (α) and inside the second region (α+β)
(3) Outside the second region (α+β)

When the difference (Δh) between the distances ($h_A$, $h_B$) matches the depth of the recess portions or the height of the protruding portions ($h_1$), the vehicle position determination unit determines that the position of the vehicle is "inside the first region (α)." When the difference (Δh) between the distances ($h_A$, $h_B$) matches the depth of the recess portions or the height of the protruding portions ($h_2$), the vehicle position determination unit determines that the position of the vehicle is "outside the first region (α) and inside the second region (α+β)." When the difference (Δh) between the distances ($h_A$, $h_B$) matches none of the depths of the recess portions or the heights of the protruding portions ($h_1$, $h_2$), the vehicle position determination unit determines that the position of the vehicle is "outside the second region (α+β)."

When the position of the vehicle is determined to be inside the first region (α), the power can be supplied even if the gap takes the maximum value ($Z_{max}$) assumed in advance. Accordingly, the supply possibility determination unit determines that "the power supply is possible." When the position of the vehicle is determined to be outside the first region (α) and inside the second region (α+β), power supply possible/impossible determination may change depending on the size of the gap and the changing of the gap. Accordingly, the supply possibility determination unit determines that "the power supply may be impossible." Alternatively, the supply possibility determination unit may determine that there is a possibility of the condition of the power supply changing from possible to impossible depending on the changing of the gap. When the position of the vehicle is determined to be outside the second region (α+β), the power cannot be supplied even if the gap takes the minimum value ($Z_{min}$) assumed in advance. Accordingly, the supply possibility determination unit determines that "the power supply is impossible."

In the parking assist system, these calculators (vehicle position determination unit, supply possibility determination unit) can be implemented on one or both of the vehicle side and the ground side. In the case where the calculators are implemented on the vehicle side, the vehicle controller 4 illustrated in FIG. 1 executes a pre-installed program and thereby functions as the vehicle position determination unit and the supply possibility determination unit, based on the distances ($h_A$, $h_B$) measured by the distance measuring units (25a, 25b). Meanwhile, in the case where the calculators are implemented on the ground side, the ground controller 21 illustrated in FIG. 1 executes a pre-installed program and thereby functions as the vehicle position determination unit and the supply possibility determination unit, based on the distances ($h_A$, $h_B$) measured by the distance measuring units (25a, 25b). In the case where the calculators are implemented on both of the vehicle side and the ground side, the vehicle controller 4 and the ground controller 21 may operate together.

The parking assist system further includes a display unit 5 which displays the result of the determination by the supply possibility determination unit, for the occupant of the vehicle 2. FIG. 1 illustrates an example of the display unit 5 mounted in the vehicle 2. However, the display unit 5 is not limited to this. A display unit installed on the ground side may display the result of the determination by the supply possibility determination unit, for the occupant of the vehicle 2.

[Parking Assist Method]

The parking assist method in the first embodiment is described with reference to the flowchart in FIGS. 7 and 8. The parking assist method in the first embodiment is executed by using the parking assist system illustrated in FIG. 1.

In step S101, the paired distance measuring units (25a, 25b) detect the reflected sound or light and thereby measure the distances ($h_A$, $h_B$) to the protruding portion 31 and the recess portion 32 simultaneously. The vehicle position determination unit calculates the difference (Δh) between the distances ($h_A$, $h_B$) (step S103), reads the depth of the recess portion or the height of the protruding portion ($h_1$) stored in a memory in the controller (step S105), and compares Δh with $h_1$ (step S107).

When Δh matches $h_1$ (YES in S107), the vehicle position determination unit determines that "the position of the vehicle is inside the first region (α)," and the supply possibility determination unit determines that "the power supply is possible." Proceeding to step S113, an image illustrated in part (a) of FIG. 9 is displayed together with a message "power supply is possible" on the display unit 5, and the supply possibility determination unit allows the wireless power supply system to supply power (S115). Thereafter, the processing proceeds to step S151 of FIG. 8.

Meanwhile, when Δh does not match $h_1$ (NO in S107), the vehicle position determination unit proceeds to step S109 to read the depth of the recess portion or the height of the protruding portion ($h_2$) stored in the memory in the controller, and compares Δh with $h_2$ (step S111).

When Δh matches $h_2$ (YES in S111), the vehicle position determination unit determines that "the position of the vehicle is outside the first region (α) and inside the second region (α+β)," and the supply possibility determination unit determines that "the power supply may be impossible." Proceeding to step S129, an image illustrated in part (b) of FIG. 9 is displayed together with a message "power supply may be impossible" on the display unit 5, and the parking assist system asks the user (occupant of the vehicle 2) whether to supply power (S131).

When the parking assist system obtains an answer from the user allowing "trial power supply" (YES in step S133), the supply possibility determination unit allows the wireless power supply system to perform the "trial power supply" (steps S135). Thereafter, the processing proceeds to step S151 of FIG. 8. Meanwhile, when the parking assist system obtains an answer from the user not allowing the "trial power supply" (NO in S133), the supply possibility determination unit displays a message "realignment is necessary" on the display unit 5 (step S137), and does not allow the wireless power supply system to perform the "trial power supply" since no permission of the user is obtained (step S139). Thereafter, the processing proceeds to step S151 of FIG. 8.

When Δh does not match $h_2$ (NO in step S111), the vehicle position determination unit determines that "the position of the vehicle is outside the second region (α+β)," and the supply possibility determination unit determines that "the power supply is impossible." Proceeding to step S141, a message "power supply is impossible, realignment is necessary" is displayed on the display unit 5, and the supply possibility determination unit does not allow the wireless power supply system to supply power (S143). Thereafter, the processing proceeds to step S151 of FIG. 8.

When an ignition switch is not off (NO in S151), it is possible to determine that the parking is not completed, and the processing thus returns to step S101 of FIG. 7. When the ignition switch is off (YES in S151), it is possible to determine that the parking is completed. The processing thus proceeds to step S153 and whether the "trial power supply" or the power supply is allowed is determined. When neither the "trial power supply" nor the power supply is allowed (NO in S153), the wireless power supply system does not start the power supply (step S157). When either the "trial power supply" or the power supply is allowed (YES in S153), the wireless power supply system starts the power supply (step S155). When an abnormality such as a decrease in the power supply efficiency or flow of an overcurrent occurs during the power supply (YES in S159), a message "power supply is impossible, realignment is necessary" is displayed on the display unit 5 (S163) and the wireless power supply system stops the power supply (step S165). When no abnormality occurs during the power supply (NO in S159), the wireless power supply system continues the power supply (step S161).

The images displayed on the display unit 5 are described. Parts (a) and (b) of FIG. 9 illustrate the first region ($\alpha$) and the second region ($\alpha+\beta$) which vary depending on the gap (Gap) and the position (coil center position CC) of the vehicle-side coil unit 7 relative to the first region ($\alpha$) and the second region ($\alpha+\beta$). Part (a) of FIG. 9 illustrates a state where the coil center position CC is inside the first region ($\alpha$), and Part (b) of FIG. 9 illustrates a state where the coil center position CC is outside the first region ($\alpha$) and inside the second region ($\alpha+\beta$).

As described above, in the first embodiment, the following operations and effects can be obtained.

The vehicle position determination unit determines the position of the vehicle relative to each of the first region ($\alpha$) in which the power supply is possible when the gap between the vehicle-side coil unit 7 and the ground-side coil unit 24 is maximum and the second region ($\beta$) in which the power supply is possible when the gap is minimum. The supply possibility determination unit determines the possibility of the power supply based on the result of the determination by the vehicle position determination unit and the display unit displays the result of the determination by the supply possibility determination unit, for the occupant of the vehicle. This increases the power supply allowable range and improves the convenience in parking compared to those in the comparative example in which only the first region ($\alpha$) is the target of the determination. For example, when the vehicle position determination unit determines that "the position of the vehicle is outside the first region ($\alpha$) and inside the second region ($\alpha+\beta$)," the parking assist system 1 leaves the determination of whether to perform the power supply to the user (occupant of the vehicle 2) while indicating that the power supply may be impossible. Since there is a possibility that the power supply can be executed even when the position of the vehicle is outside the first region ($\alpha$), this increases the power supply allowable range and improves the convenience in parking.

When the position of the vehicle is determined to be outside the first region ($\alpha$) and inside the second region ($\alpha+\beta$), the supply possibility determination unit determines that the condition of the power supply may change from possible to impossible depending on the changing of the gap. This enables the power supply possible/impossible determination suiting the state of the vehicle.

Providing the combination of the recess and protruding structures ($\alpha$, $\beta$) and the distance measuring units (25a, 25b) on the vehicle side and the ground side enables the determination of the vehicle position relative to the first and second regions.

Second Embodiment

In a second embodiment, the gap between the vehicle-side coil unit 7 and the ground-side coil unit 24 is measured during the parking assist and the possibility of the power supply is determined based on the measurement value of the gap. Furthermore, in the second embodiment, the position of the vehicle relative to a third region in which the power supply is possible when the gap is between the maximum and the minimum is determined and the possibility of the power supply is determined based on a result of this determination and the gap measurement value.

A parking assist system in the second embodiment is the system in the first embodiment further including a measurement sensor configured to measure the gap. However, the distance measuring units (25a, 25b) can be used as the measurement sensor. For example, the shorter one of the measurement values of the distance measuring units (25a, 25b) may be used as the gap measurement value. The distance from the distance measuring unit (25a, 25b) to the protruding portion 31 can be thereby measured as the gap between the vehicle-side coil unit 7 and the ground-side coil unit 24.

As illustrated in the schematic view of FIG. 10, in the parking assist system 1, a first intermediate region ($\alpha+\gamma 1$) and a second intermediate region ($\alpha+\gamma 1+\gamma 2$) are set in advance as the third region in which the power supply is possible when the gap is between the maximum and the minimum. As a matter of course, the first region ($\alpha$) and the second region ($\alpha+\beta$) are also set in advance. The first intermediate region ($\alpha+\gamma 1$) is a power suppliable region in the case where the gap is Z1, and the second intermediate region ($\alpha+\gamma 1+\gamma 2$) is a power suppliable region in the case where the gap is Z2. The sizes of the intermediate gaps Z1 and Z2 are between the maximum value ($Z_{max}$) and the minimum value ($Z_{min}$), and Z1 is larger than Z2. The second intermediate region ($\alpha+\gamma 1+\gamma 2$) includes the entire first intermediate region ($\alpha+\gamma 1$). FIG. 10 is a drawing in which Z1, Z2, the first intermediate region ($\alpha+\gamma 1$), and the second intermediate region ($\alpha+\gamma 1+\gamma 2$) are added to the schematic view of FIG. 4.

The vehicle position determination unit determines the position of the vehicle 2 relative to each of the first intermediate region ($\alpha+\gamma 1$) and the second intermediate region ($\alpha+\gamma 1+\gamma 2$), in addition to the first region ($\alpha$) and the second region ($\alpha+\gamma 1+\gamma 2+\beta$). Then, the supply possibility determination unit determines the possibility of the power supply, based on a result of the determination by the vehicle position determination unit and the gap measurement value. Specifically, when the position of the vehicle is determined to be outside the first region ($\alpha$) and inside the second region ($\alpha+\beta$), the supply possibility determination unit determines the possibility of the power supply, based on the gap measurement value. This enables power supply possible/impossible determination suiting the state of the vehicle. The power supply allowable range is increased and the convenience in parking is improved compared to those in the comparative example in which only the first region ($\alpha$) is the target of the determination.

For example, as illustrated in part (a) of FIG. 11, the parking assist system includes the first recess and protruding structure α, a first intermediate recess and protruding structure γ1, a second intermediate recess and protruding structure γ2, and the second recess and protruding structure β. The first recess and protruding structure α is formed in a region which corresponds to the first region (α) and which is on one side out of the ground side and the vehicle side. The first intermediate recess and protruding structure γ1 is formed in a region which corresponds to a region (γ1) within the first intermediate region (α+γ1) exclusive of the first region (α) and which is on the one side. The second intermediate recess and protruding structure γ2 is formed in a region which corresponds to a region (γ2) within the second intermediate region (α+γ1+γ2) exclusive of the first intermediate region (α+γ1) and which is on the one side. The second recess and protruding structure β is formed in a region which corresponds to a region (β) within the second region (α+γ1+γ2+β) exclusive of the second intermediate region (α+γ1+γ2) and which is on the one side. When the recess and protruding structures (α, γ1, γ2, β) are formed in the regions on the vehicle side, as illustrated in FIG. 1, the recess and protruding structures (α, γ1, γ2, β) can be formed on the lower surface of the vehicle coil cover 11 located near the bottom face of the vehicle-side coil unit 7. As another example, the recess and protruding structures (α, γ1, γ2, β) may be formed on an upper surface of the ground-side coil unit 24.

The first region (α), the first intermediate region (α+γ1), the second intermediate region (α+γ1+γ2), and the second region (α+γ1+γ2+β) which are illustrated in part (a) of FIG. 11 correspond to regions projected on the XY-plane of FIG. 5. Each of the recess and protruding structures (α, γ1, γ2, β) is formed by alternately and repeatedly disposing the protruding portions 31 and the recess portions 32 in the Y-axis direction. The protruding portions 31 and the recess portions 32 extend parallel to one another in the X-axis direction. A plane pattern of the protruding portions 31 and the recess portions 32 is thus a stripe pattern.

As illustrated in parts (b) and (c) of FIG. 11, the depth of recess portions or the height of the protruding portions ($h_1$, $h_2$, $h_3$, $h_4$) varies among the recess and protruding structures (α, γ1, γ2, β). Moreover, the pitch (L2) is the same among the recess and protruding structures (α, γ1, γ2, β). In other words, the widths (L2) of the protruding portions 31 and the recess portions 32 in the Y-axis direction are the same in all of the recess and protruding structures (α, γ1, γ2, β).

As illustrated in part (c) of FIG. 11, the parking assist system further includes at least two distance measuring units (25a, 25b) which are disposed at an interval equal to the pitch (L2) in the recess and protruding structures (α, γ1, γ2, β) on the other one of the ground side and the vehicle side. The distance measuring units (25a, 25b) are arranged in the Y-axis direction and measure the distance in the Z direction. Accordingly, the paired distance measuring units (25a, 25b) can detect sound or light reflected by the protruding portion 31 and the recess portion 32, respectively, regardless of the position thereof relative to the recess and protruding structures (α, γ1, γ2, β). Hence, the distance measuring units (25a, 25b) can measure the distances ($h_A$, $h_B$)) to the protruding portion 31 and the recess portion 32 simultaneously.

The parking assist system (vehicle position determination unit) can determine the position of the vehicle 2 relative to the ground-side coil unit 24 by comparing the difference (Δh) between the distances ($h_A$, $h_B$) measured respectively by the two distance measuring units (25a, 25b) with the depth of the recess portions or the height of the protruding portions ($h_1$, $h_2$, $h_3$, $h_4$). In other words, the parking assist system can determine the position of the vehicle 2 relative to each of the first region (α), the first intermediate region (α+γ1), the second intermediate region (α+γ1+γ2), and the second region (α+γ1+γ2+β).

For example, the vehicle position determination unit determines under which one of the following five conditions the position of the vehicle falls.

(1) Inside the First Region (α)
(2) Outside the first region (α) and inside the first intermediate region (α+γ1)
(3) Outside the first intermediate region (α+γ1) and inside the second intermediate region (α+γ1+γ2)
(4) Outside the second intermediate region (α+γ1+γ2) and inside the second region (α+γ1+γ2+β)
(5) Outside the second region (α+γ1+γ2+β)

The parking assist method in the second embodiment is described with reference to the flowchart in FIGS. 12 to 14. The parking assist method in the second embodiment is executed by using the parking assist system illustrated in FIG. 1.

In step S01, the paired distance measuring units (25a, 25b) detect the reflected sound or light and thereby measure the distances ($h_A$, $h_B$) to the protruding portion 31 and the recess portion 32 simultaneously. The vehicle position determination unit calculates the difference (Δh) between the distances ($h_A$, $h_B$) (step S03), reads the depth of the recess portion or the height of the protruding portion ($h_1$) stored in the memory in the controller (step S05), and compares Δh with $h_1$ (step S07).

When Δh matches $h_1$ (YES in S07), the vehicle position determination unit determines that "the position of the vehicle is inside the first region (α)," and the supply possibility determination unit determines that "the power supply is possible." Proceeding to step S13, an image illustrated in part (a) of FIG. 15 is displayed together with the message "power supply is possible" on the display unit 5, and the supply possibility determination unit allows the wireless power supply system to supply power (S15). Thereafter, the processing proceeds to step S89 of FIG. 13.

Meanwhile, when Δh does not match $h_1$ (NO in S07), the vehicle position determination unit proceeds to step S09 to read the depth of the recess portion or the height of the protruding portion ($h_2$) stored in the memory in the controller, and compares Δh with $h_2$ (step S11).

When Δh matches $h_2$ (YES in S11), the vehicle position determination unit determines that "the position of the vehicle is outside the first region (α) and inside the first intermediate region (α+γ1)." The vehicle position determination unit proceeds to step S17 to read the gap (Z1) in the first intermediate region (α+γ1), and compares Z1 with the distance $h_A$ (step S19).

When the distance $h_A$ is smaller than Z1 (YES in S19), the vehicle position determination unit reads a preset gap variation range (Gv) from the memory (step S21) and compares Z1 with a value obtained by adding the gap variation range (Gv) to the distance $h_A$ (step S23). When the value obtained by adding the gap variation range (Gv) to the distance $h_A$ is smaller than Z1 (YES in S23), the supply possibility determination unit determines that "the power supply is possible." Proceeding to step S25, an image illustrated in part (a) of FIG. 16 is displayed together with the message "power supply is possible" on the display unit 5, and the supply possibility determination unit allows the wireless power supply system to supply power (S27). Thereafter, the processing proceeds to step S89 of FIG. 13. The gap variation range (Gv) is an amount of variation in the gap which changes depending on ingress and egress of occupants and loading and unloading of luggage. An initial value of the gap variation range is set to the maximum variation range (for example, 20 mm) but can be adjusted depending on the amount of loads and the number of occupants inputted by the occupant.

When the value obtained by adding the gap variation range (Gv) to the distance $h_A$ is equal to or larger than Z1 (NO in S23), the supply possibility determination unit determines that "the power supply may be impossible." Proceeding to step S29, an image illustrated in part (b) of FIG. 16 is displayed together with the message "power supply may be impossible after egress" on the display unit 5, and the parking assist system asks the user (occupant of the vehicle 2) whether to supply power (S31).

When the parking assist system obtains an answer from the user allowing the "trial power supply" (YES in step S33), the supply possibility determination unit allows the wireless power supply system to perform the "trial power supply" (steps S35). Thereafter, the processing proceeds to step S89 of FIG. 8. Thereafter, the processing proceeds to step S89 of FIG. 13. Meanwhile, when the parking assist system obtains an answer from the user not allowing the "trial power supply" (NO in S33), the supply possibility determination unit displays the message "realignment is necessary" on the display unit 5 (step S37), and does not allow the wireless power supply system to perform the "trial power supply" since no permission of the user is obtained (step S39). Thereafter, the processing proceeds to step S89 of FIG. 13.

Meanwhile, when the distance $h_A$ is equal to or larger than Z1 (NO in S19), the supply possibility determination unit determines that "the power supply is impossible." Proceeding to step S41, an image illustrated in part (c) of FIG. 16 is displayed together with the message "power supply is impossible, realignment is necessary" on the display unit 5, and the supply possibility determination unit does not allow the wireless power supply system to supply power (S43). Thereafter, the processing proceeds to step S89 of FIG. 13.

Returning to step S11, when Δh does not match $h_2$ (NO in step S11), the vehicle position determination unit proceeds to step S45 to read the depth of the recess portion or the height of the protruding portion ($h_3$) from the memory, and compares Δh with $h_3$ (step S47).

When Δh matches $h_3$ (YES in S47), the vehicle position determination unit determines that "the position of the vehicle is outside the first intermediate region (α±γ1) and inside the second intermediate region (α+γ1+γ2)." The vehicle position determination unit proceeds to step S49 to read the gap (Z2) in the second intermediate region (α+γ1+γ2), and compares Z2 with the distance $h_A$ (step S51).

When the distance $h_A$ is smaller than Z2 (YES in S51), the vehicle position determination unit reads the preset gap variation range (Gv) from the memory (step S53) and compares Z2 with the value obtained by adding the gap variation range (Gv) to the distance $h_A$ (step S55). When the value obtained by adding the gap variation range (Gv) to the distance $h_A$ is smaller than Z2 (YES in S55), the supply possibility determination unit determines that "the power supply is possible." Proceeding to step S57, an image illustrated in part (a) of FIG. 17 is displayed together with the message "power supply is possible" on the display unit 5, and the supply possibility determination unit allows the wireless power supply system to supply power (S59). Thereafter, the processing proceeds to step S89 of FIG. 13.

When the value obtained by adding the gap variation range (Gv) to the distance $h_A$ is equal to or larger than Z2 (NO in S55), the supply possibility determination unit determines that "the power supply may be impossible." Proceeding to step S61, an image illustrated in part (b) of FIG. 17 is displayed together with the message "power supply may not be possible after egress" on the display unit 5, and the parking assist system asks the user (occupant of the vehicle 2) whether to supply power (step S63).

When the parking assist system obtains an answer from the user allowing the "trial power supply" (YES in S65), the supply possibility determination unit allows the wireless power supply system to perform the "trial power supply" (step S67). Thereafter, the processing proceeds to step S89 of FIG. 13. Meanwhile, when the parking assist system obtains an answer from the user not allowing the "trial power supply" (NO in S65), the supply possibility determination unit displays the message "realignment is necessary" on the display unit 5 (step S69), and does not allow the wireless power supply system to perform the "trial power supply" since no permission of the user is obtained (step S71). Thereafter, the processing proceeds to step S89 of FIG. 13.

Meanwhile, when the distance $h_A$ is equal to or larger than Z2 (NO in S51), the supply possibility determination unit determines that "the power supply is impossible." Proceeding to step S73, an image illustrated in part (c) of FIG. 17 is displayed together with the message "power supply is impossible, realignment is necessary" on the display unit 5, and the supply possibility determination unit does not allow the wireless power supply system to supply power (S75). Thereafter, the processing proceeds to step S89 of FIG. 13.

Returning to step S47, when Δh does not match $h_3$ (NO in step S47), the vehicle position determination unit proceeds to step S77 to read the depth of the recess portion or the height of the protruding portion ($h_4$) from the memory, and compares Δh with $h_4$ (step S79).

When Δh matches $h_4$ (YES in S79), the vehicle position determination unit determines that "the position of the vehicle is outside the second intermediate region (α+γ1+γ2) and inside the second region (α+γ1+γ2+β)." Proceeding to step S81, an image illustrated in part (b) of FIG. 15 is displayed together with the message "power supply is impossible, realignment is necessary" on the display unit 5, and the supply possibility determination unit does not allow the wireless power supply system to supply power (S83). Thereafter, the processing proceeds to step S89 of FIG. 13.

Meanwhile, when Δh does not match $h_4$ (NO in step S79), the vehicle position determination unit determines that "the position of the vehicle is outside the second region (α+γ1+γ2+β)." Proceeding to step S85, the message "power supply is impossible, realignment is necessary" is displayed on the display unit 5, and the supply possibility determination unit does not allow the wireless power supply system to supply power (S87). Thereafter, the processing proceeds to step S89 of FIG. 13.

When the ignition switch is not off in step S89 (NO in S89), it is possible to determine that the parking is not completed, and the processing thus returns to step S01 of FIG. 12. When the ignition switch is off (YES in S89), it is possible to determine that the parking is completed and the processing thus proceeds to step S91 and whether the "trial power supply" or the power supply is allowed is determined. When neither the "trial power supply" nor the power supply is allowed (NO in S91), the wireless power supply system does not start the power supply (step S95). When either the "trial power supply" or the power supply is allowed (YES in S91), the wireless power supply system starts the power supply (step S97), provided that the state of charge (SOC) is not full (NO in S93). When the state of charge is full (YES in S93), the wireless power supply system does not start the power supply (step S95).

As described above, in the second embodiment, the following operations and effects can be obtained.

When the position of the vehicle is determined to be outside the first region (α) and inside the second region (α+γ1+γ2+β), the supply possibility determination unit determines the possibility of the power supply, based on the gap measurement value measured by the distance measuring units (25a, 25b). This enables appropriate power supply possible/impossible determination depending on the gap measurement value.

The vehicle position determination unit determines the position of the vehicle 2 relative to the third region (γ1, γ2) in which the power supply is possible when the gap is the intermediate gap (Z1, Z2) between the maximum and the minimum. The supply possibility determination unit determines the possibility of the power supply, based on the result of the determination by the vehicle position determination unit and the gap measurement value. This enables appropriate and detailed power supply possible/impossible determination depending on the gap measurement value.

The supply possibility determination unit determines that the power supply is possible when the position of the vehicle 2 is determined to be inside the third region (γ1, γ2) and the value obtained by adding the gap variation range (Gv) to the gap measurement value is smaller than the intermediate gap (Z1, Z2). The possibility of the power supply can be determined in consideration of the gap variation range (Gv) related to ingress and egress. This enables more appropriate and detailed power supply possible/impossible determination depending on the gap measurement value.

Although the contents of the present invention are described above by using the embodiments, the present invention is not limited to the above description. It is apparent to those skilled in the art that various changes and modifications are possible.

REFERENCE SIGNS LIST 1 parking assist system
2 vehicle
4 vehicle controller (vehicle position determination unit, supply possibility determination unit)
5 display unit
7 vehicle-side coil unit
21 ground controller (vehicle position determination unit, supply possibility determination unit)
24 ground-side coil unit
25a, 25b distance measuring units
Gv gap variation range
L1, L2 pitch
Z1, Z2 intermediate gap
α first recess and protruding structure
β second recess and protruding structure
γ1 first intermediate recess and protruding structure
γ2 second intermediate recess and protruding structure

The invention claimed is:

1. A parking assist system used in a wireless power supply system which performs wireless power supply between a ground-side coil unit and a vehicle-side coil unit, the parking assist system comprising:

a measurement sensor configured to measure a gap between the vehicle-side coil unit and the ground-side coil unit; and
a controller configured to
set in advance a first region defined in a plane including an X-axis direction and a Y-axis direction perpendicular to a Z-axis direction, which is a height direction of a vehicle, in which the wireless power supply is possible when the gap, which is a distance in the Z-axis direction, between the vehicle-side coil unit and the ground-side coil unit is maximum and a second region defined in the plane in which the wireless power supply is possible when the gap is minimum, and
determine a position of the vehicle-side coil unit in the X-axis and Y-axis directions relative to each of the first region and the second region, and
determine a possibility of the wireless power supply based on a gap measurement value measured by the measurement sensor when the position of the vehicle-side coil unit is determined to be outside the first region and inside the second region, and
a display configured to display a result of the determination to an occupant of the vehicle.

2. The parking assist system according to claim 1, wherein the controller is further configured to set in advance a third region defined in the plane in which the wireless power supply is possible when the gap is an intermediate gap between the maximum and the minimum; determine the position of the vehicle-side coil unit relative to the third region, and determine the possibility of the wireless power supply, based on the gap measurement value and a result of the determination on the position of the vehicle-side coil unit relative to the third region.

3. The parking assist system according to claim 2, wherein the controller determines that the wireless power supply is possible when the position of the vehicle: side coil unit is determined to be inside the third region and a gap value obtained by adding a gap variation range to the gap measurement value is smaller than the intermediate gap.

4. The parking assist system according to claim 1, further comprising:

a first recess and protruding structure formed in a region which corresponds to the first region and which is on one of a ground side and a vehicle side;
a second recess and protruding structure formed in a region which corresponds to a region within the second region exclusive of the first region and which is formed on the one of the ground side and the vehicle side; and
two distance sensors disposed on the other one of the ground side and the vehicle side, at an interval equal to a pitch in the first recess and protruding structure and the second recess and protruding structure,
wherein
a depth of a recess portion or a height of a protruding portion in the first recess and protruding structure is different from that in the second recess and protruding structure, and the pitch in the first recess and protruding structure is the same as the pitch in the second recess and protruding structure, and
the controller is configured to determine the position of the vehicle-side coil unit by comparing a difference between distances measured respectively by the two distance sensors and the depth of the recess portion or the height of the protruding portion.

5. A parking assist method used in a wireless power supply system which performs wireless power supply between a ground-side coil unit and a vehicle-side coil unit, comprising:

setting in advance a first region defined in a plane including an X-axis direction and a Y-axis direction perpendicular to a Z-axis direction, which is a height direction of a vehicle, in which the wireless power supply is possible when a gap, which is a distance in the Z-axis direction, between the vehicle-side coil unit and the ground-side coil unit is maximum and a second region defined in the plane in which the wireless power supply is possible when the gap is minimum, determining a position of the vehicle-side coil unit in the X-axis direction and in the Y-axis direction relative to each of the first region and the second region;

measuring the gap;

determining a possibility of wireless power supply, based on the measured gap, when the position of the vehicle-side coil unit is determined to be outside the first region and inside the second region; and displaying a result of the determination of the possibility of the wireless power supply to an occupant of the vehicle.

* * * * *